(12) United States Patent
Kaneko et al.

(10) Patent No.: US 7,637,247 B2
(45) Date of Patent: Dec. 29, 2009

(54) DEVICE AND METHOD FOR DETERMINING KNOCKING OF INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Yuichi Takemura, Anjo (JP); Shuhei Oe, Kariya (JP)

(73) Assignees: Toyota Jidosha Kabushiki Kaisha, Tokyo-shi (JP); Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 459 days.

(21) Appl. No.: 11/684,786

(22) Filed: Mar. 12, 2007

(65) Prior Publication Data

US 2007/0214869 A1 Sep. 20, 2007

(30) Foreign Application Priority Data

Mar. 20, 2006 (JP) ............................. 2006-076912

(51) Int. Cl.
*G01L 23/22* (2006.01)
*F02D 45/00* (2006.01)
(52) U.S. Cl. ................. 123/406.29; 73/35.09
(58) Field of Classification Search ............ 123/406.29, 123/406.12, 406.13, 406.56, 406.21, 406.39; 73/35.09, 35.01, 35.05, 35.04, 117.3; 701/111
See application file for complete search history.

(56) References Cited

U.S. PATENT DOCUMENTS 4,637,245 A    1/1987 Iwata et al.
6,151,954 A    11/2000 Aoki et al.
6,688,286 B2    2/2004 Kokubo et al.
6,947,829 B2 *  9/2005 Honda .................. 701/111
7,206,691 B2 *  4/2007 Kaneko et al. ........... 701/111
2004/0204814 A1  10/2004 Honda

FOREIGN PATENT DOCUMENTS

| JP | 4-76249 | 3/1992 |
|---|---|---|
| JP | 10-77944 | 3/1998 |
| JP | 2003-21032 | 1/2003 |
| JP | 2003-278592 | 10/2003 |
| JP | 2004-353531 | 12/2004 |
| JP | 2005-23902 | 1/2005 |
| JP | 2005-330954 | 12/2005 |
| WO | WO 2007/004597 A1 | 1/2007 |

* cited by examiner

*Primary Examiner*—Hieu T Vo
(74) *Attorney, Agent, or Firm*—Oblon, Spivak, McClelland, Maier & Neustadt, L.L.P.

(57) ABSTRACT

An engine ECU executes a program including a step of, when it has temporarily been determined that knocking had occurred because of the presence of an integrated value greater than a product of the reference magnitude and coefficient Y among the integrated values of vibration in fourth frequency band D that includes first to third frequency bands A to C, calculating knock magnitude N using the integrated values in the synthesized waveform of first to third frequency bands A to C and correlation coefficient K calculated from a vibration waveform of fourth frequency band D. Based on a comparison between knock magnitude N and determination value V(KX), whether or not knocking has occurred is determined. If there is no integrated value greater than a product of the reference magnitude and coefficient Y, it is determined that knocking has not occurred.

15 Claims, 21 Drawing Sheets

FIG. 9
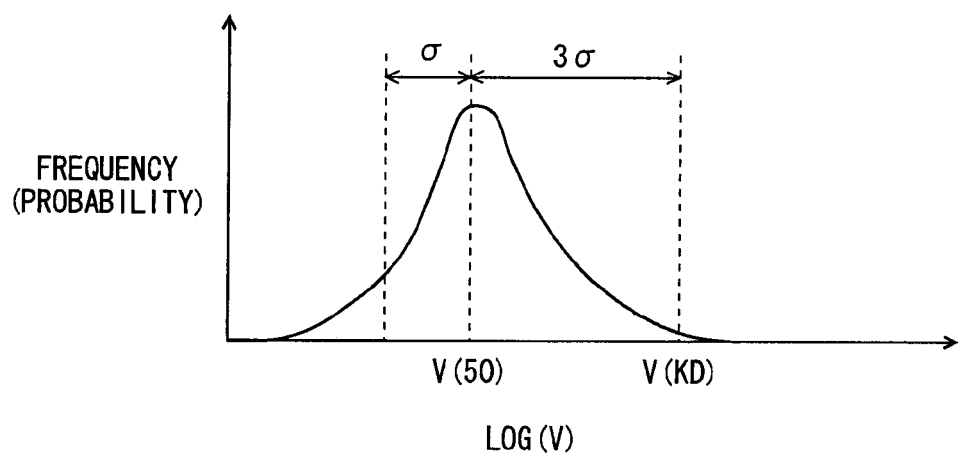
FIG. 10
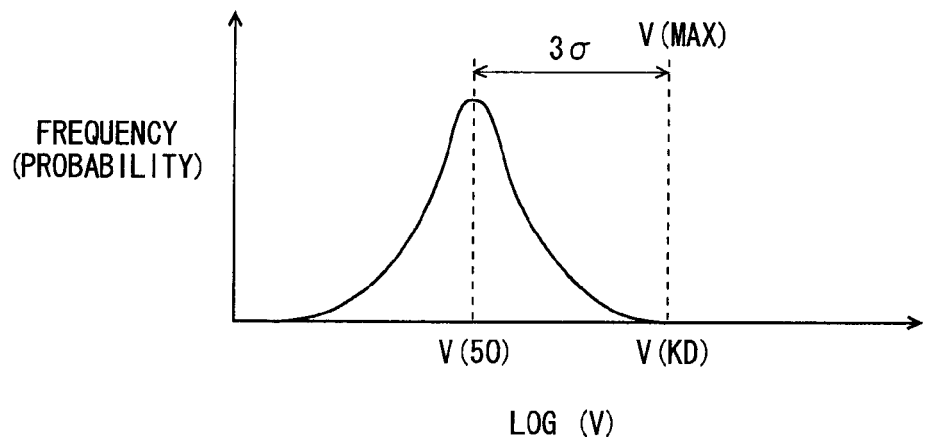
FIG. 11

DEVICE AND METHOD FOR DETERMINING KNOCKING OF INTERNAL COMBUSTION ENGINE

This nonprovisional application is based on Japanese Patent Application No. 2006-076912 filed with the Japan Patent Office on Mar. 20, 2006, the entire contents of which are hereby incorporated by reference.

BACKGROUND OF THE INVENTION

1. Field of the Invention

The present invention relates to device and method for determining knocking of an internal combustion engine, and particularly to a technique of determining whether knocking is present or absent based on a waveform of vibration of an internal combustion engine.

2. Description of the Background Art

Conventionally, various methods of determining whether knocking (knock) is present or absent have been proposed. For example, by detecting magnitude of vibration occurring in an internal combustion engine and comparing the magnitude with a threshold value, whether knocking is present or absent is determined. However, in an internal combustion engine, besides vibration due to knocking, vibration due to an intake valve or an exhaust valve sitting on its seat may occur. Vibration may also occur due to the actuation of an injector (in particular, an in-cylinder direct injector that directly injects fuel inside a cylinder) or a high-pressure pump that supplies fuel to the injector. When such vibration is detected as noise, it may not be possible to discriminate vibration due to knocking from vibration due to noise, based on magnitude of vibration. Accordingly, a technique of determining whether knocking is present or absent in consideration of both magnitude of vibration and a waveform shape has been proposed.

Japanese Patent Laying-Open No. 2003-021032 discloses a knock control device for an internal combustion engine in which a statistical processing program that determines knocking has occurred when an output value greater than a knock determination value corrected by statistical processing is detected and a waveform shape program determining whether knocking is present or absent from a waveform of vibration are used. The knock control device for an internal combustion engine disclosed in Japanese Patent Laying-Open No. 2003-021032 includes: a knock sensor detecting knocking in an internal combustion engine; a statistical processing portion statistically processing a signal detected by the knock sensor and input through a low-pass filter and a high-pass filter; a first temporal determination portion determining occurrence of knocking based on a processing result by the statistical processing portion; a second temporal determination portion determining occurrence of knocking based on a waveform shape of the signal detected by the knock sensor and input through the low-pass filter and the high-pass filter; and a final determination portion finally determining occurrence of knocking based on the knock temporal determination of the first temporal determination portion and the knock temporal determination of the second temporal determination portion. When both of the first and second temporal determination portions determine that knocking has occurred, the final determination portion finally determines that knocking has occurred.

According to the knock control device disclosed by the publication, a knock temporal determination by a statistical processing program and a knock temporal determination by a waveform shape program are used, and only when both of the temporal determinations determine that knocking has occurred, it is finally determined that knocking has occurred. As a result, occurrence of knocking can precisely be determined even as to an output signal, which has been erroneously determined by a knock determination employing solely the statistical processing program or the waveform shape program.

In the knock control device for an internal combustion engine of Japanese Patent Laying-Open No. 2003-021032, a low-pass filter and a high-pass filter are employed. In order to reduce noise components to improve precision in detecting vibration particular to knocking, it is effective to narrow the bandwidth of a filter extracting only vibration of a predetermined bandwidth. On the other hand, narrowing the bandwidth of a filter, vibration of noise components is removed and, as a result, a characteristic portion of noise components (such as occurrence timing of vibration, attenuation rate and the like) is removed also from the detected waveform. In this case, even as to vibration that is actually due to noise components, a waveform that is similar to a waveform at the time of knocking may be detected. Therefore, the vibration at the time of knocking and the vibration due to noise components are hardly discriminated from each other based on a waveform. However, no consideration on the bandwidth of the filters is made in Japanese Patent Laying-Open No. 2003-021032. Accordingly, even when knocking has not occurred, it may erroneously be determined that knocking has occurred.

SUMMARY OF THE INVENTION

An object of the present invention is to provide a device and the like for determining knocking of an internal combustion engine that can precisely determine whether knocking is present or absent.

A device for determining knocking of an internal combustion engine according to one aspect of the present invention includes an operation unit. The operation unit detects a magnitude of vibration in a first frequency band that includes a frequency of vibration due to knocking, out of vibration occurring in the internal combustion engine. The operation unit detects a magnitude of vibration in a second frequency band that includes the first frequency band and that is broader than the first frequency band, out of the vibration occurring in the internal combustion engine. The operation unit detects a waveform of the vibration in the second frequency band, based on the magnitude of the vibration in the second frequency band. The operation unit determines whether or not a magnitude greater than a predetermined threshold value is detected from the vibration in the second frequency band. When it is determined that the magnitude greater than the predetermined threshold value is detected from the vibration in the second frequency band, the operation unit determines whether or not knocking has occurred based on a result of comparison between the waveform detected from the magnitude of the vibration in the second frequency band and a waveform model that is a reference of the vibration occurring in the internal combustion engine and on the magnitude of the vibration in the first frequency band. When it is determined that the magnitude greater than the predetermined threshold value is not detected from the vibration in the second frequency band, the operation unit determines that knocking has not occurred.

According to the present invention, a magnitude of vibration in a first frequency band that includes a frequency of vibration due to knocking is detected, out of vibration occurring in the internal combustion engine. Thus, the magnitude of vibration particular to knocking can precisely be obtained.

However, if the bandwidth of the frequency band is narrowed when detecting a waveform from the magnitude of vibration, vibration of noise components is removed. As a result, a characteristic portion of noise components (such as occurrence timing of vibration, attenuation rate and the like) is removed also from the waveform. In this case, even as to vibration that is actually due to noise components, a waveform that is similar to a waveform at the time of knocking may be detected. Therefore, the vibration at the time of knocking and the vibration due to noise components are hardly discriminated from each other based on a waveform. Accordingly, a magnitude of vibration in a second frequency band that includes the first frequency band and that is broader than the first frequency band is detected. A waveform of the vibration in the second frequency band is detected, based on the magnitude of the vibration in the second frequency band. Thus, a waveform that may include vibration due to noise components can be detected. When a magnitude greater than a predetermined threshold value is detected from the vibration in the second frequency band, it can be regarded that knocking is likely to have occurred. Conversely, when a magnitude greater than a threshold value is not detected from the vibration in the second frequency band, it can be regarded that knocking is less likely to have occurred. Accordingly, when it is determined that the magnitude greater than the threshold value is detected from the vibration in the second frequency band, whether or not knocking has occurred is determined based on a result of comparison between the waveform detected from the magnitude of the vibration in the second frequency band and a waveform model and on the magnitude of the vibration in the first frequency band. On the other hand, when it is determined that the magnitude greater than the threshold value is not detected from the vibration in the second frequency band, it is determined that knocking has not occurred. Thus, when it can be regarded that knocking is likely to have occurred, whether or not knocking has occurred can precisely be determined fully considering the characteristics of both knocking and noise. This can suppress erroneous determination that knocking has occurred while it has not. As a result, a device for determining knocking of an internal combustion engine that can precisely determine whether knocking is present or absent can be provided.

Preferably, the operation unit determines whether or not a magnitude greater than the predetermined threshold value is detected from the vibration in the second frequency band in a first interval of crank angle out of the first interval of crank angle and a second interval of crank angle in which a magnitude of the vibration due to knocking is smaller than in the first interval. When it is determined that the magnitude greater than the predetermined threshold value is detected from the vibration in the second frequency band in the first interval, the operation unit determines whether or not knocking has occurred based on a result of comparison between the waveform detected from the magnitude of the vibration in the second frequency band and the waveform model and on the magnitude of the vibration in the first frequency band. When it is determined that the magnitude greater than the predetermined threshold value is not detected from the vibration in the second frequency band in the first interval, the operation unit determines that knocking has not occurred.

According to the present invention, whether or not a magnitude greater than the predetermined threshold value is detected from the vibration in the second frequency band in a first interval of crank angle out of the first interval of crank angle and a second interval of crank angle, in which a magnitude of the vibration that is vibration in the second frequency band and that is due to knocking is smaller than in the first interval, is determined. Knocking has such a characteristic that it occurs at approximately the same crank angle, and that the magnitude of vibration due to knocking attenuates after the occurrence of knocking. Therefore, when the magnitude greater than the threshold value is detected from the vibration in the second frequency band in the first interval, it can be regarded that knocking is likely to have occurred. Conversely, when the magnitude greater than the threshold value is not detected from the vibration in the second frequency band in the first interval, it can be regarded that knocking is less likely to have occurred. Accordingly, when it is determined that the magnitude greater than the threshold value is detected from the vibration in the second frequency band in the first interval, whether or not knocking has occurred is determined based on a result of comparison between the waveform detected from the magnitude of the vibration in the second frequency band and the waveform model and on the magnitude of the vibration in the first frequency band. On the other hand, when it is determined that the magnitude greater than the predetermined threshold value is not detected from the vibration in the second frequency band in the first interval, it is determined that knocking has not occurred. Thus, when it can be regarded that knocking is likely to have occurred, whether or not knocking has occurred can precisely be determined fully considering the characteristics of both knocking and noise. This can suppress erroneous determination that knocking has occurred while it has not.

Further preferably, when it is determined that the magnitude greater than the predetermined threshold value is not detected from the vibration in the second frequency band, the operation unit determines that knocking has not occurred, while not determining whether knocking has occurred or not based on a result of comparison between the waveform detected from the magnitude of the vibration in the second frequency band and the waveform model and on the magnitude of the vibration in the first frequency band.

According to the present invention, when knocking is less likely to have occurred, it is determined that knocking has not occurred, while not determining whether knocking has occurred or not based on a result of comparison between the waveform detected from the magnitude of the vibration in the second frequency band and the waveform model and on the magnitude of the vibration in the first frequency band. Thus, when knocking is less likely to have occurred, unnecessary processing can be suppressed from being performed.

Further preferably, the threshold value is a value calculated based on predetermined number of magnitudes selected by placing higher priority on smaller magnitudes out of the detected magnitudes.

According to the present invention, the threshold value is calculated based on predetermined number of magnitudes selected by placing higher priority on smaller magnitudes. Thus, the threshold value can be calculated based on the magnitude that may not be due to knocking or noise and that may be the mechanical vibration of the internal combustion engine itself Accordingly, the threshold value suitable for individual internal combustion engine can be obtained. By comparing such a threshold value and the detected magnitude with each other, the possibility that knocking have occurred can precisely be determined.

Further preferably, the threshold value is a value calculated as a product of an average value of predetermined number of magnitudes selected by placing higher priority on smaller magnitudes out of the detected magnitudes and a predetermined coefficient.

According to the present invention, the threshold value is calculated as a product of an average value of predetermined number of magnitudes selected by placing higher priority on smaller magnitudes and a predetermined coefficient. Thus, the threshold value can be calculated based on the magnitude that may not be due to knocking or noise and that may be the mechanical vibration of the internal combustion engine itself. Accordingly, the threshold value suitable for individual internal combustion engine can be obtained. By comparing such a threshold value and the detected magnitude with each other, the possibility that knocking have occurred can precisely be determined.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a chart showing a map of determination values V(KX) stored in the ROM or SRAM of the engine ECU;

FIG. 10 is a chart (No. b 1) showing frequency distribution of magnitude values LOG(V);

FIG. 11 is a chart (No. b 2) showing frequency distribution of magnitude values LOG(V);

DESCRIPTION OF THE PREFERRED EMBODIMENTS

Figure 1:
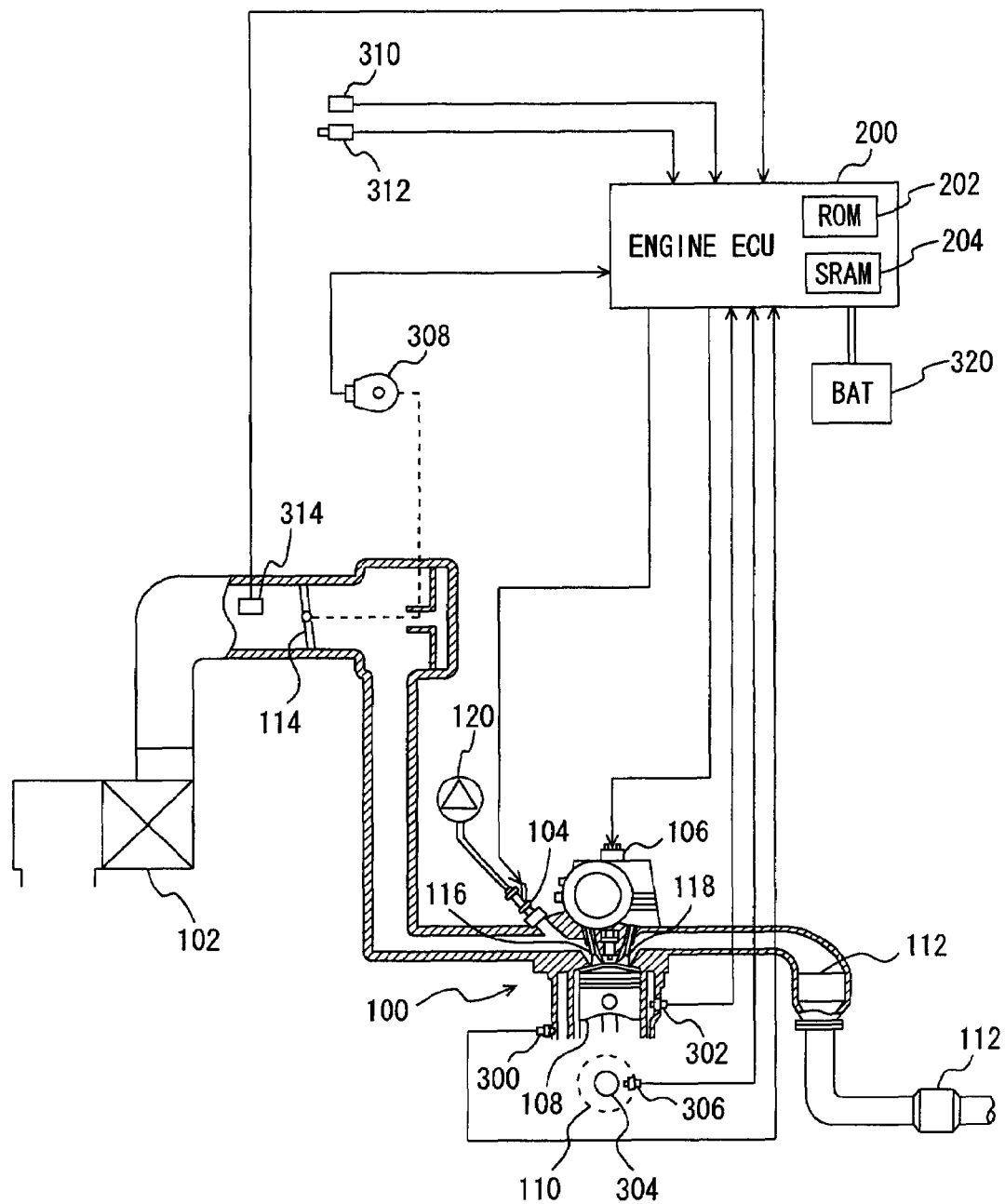
FIG. 1 is a schematic configuration diagram of an engine controlled by an engine ECU which is a knocking determination device according to an embodiment of the present invention.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle mounted with a knocking determination device according to the embodiment of the present invention will be described. Engine 100 is provided with a plurality of cylinders. The knocking determination device according to the present invention is accomplished by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air amount drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a sensor 308 of an opening position of throttle, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates voltage in response to vibration of engine 100. Magnitude of the voltage corresponds to magnitude of the vibration. Knock sensor 300 sends a signal representing voltage to engine ECU 200. Water temperature sensor 302 detects temperature of cooling water in a water jacket of engine 100 and sends a signal representing a detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of the timing rotor 304. When timing rotor 304 rotates, an air gap between the protrusion of timing rotor 304 and crank position sensor 306 changes and, as a result, magnetic flux passing through a coil portion of crank position sensor 306 increases and decreases to generate electromotive force in the coil portion. Crank position sensor 306 sends a signal representing the electromotive force to engine ECU 200. Engine ECU 200 detects a crank angle and the number of rotations of crankshaft 110 based on the signal sent from crank position sensor 306.

Sensor 308 of the opening position of throttle detects an opening position of throttle and sends a signal representing a detection result to engine ECU 200. Vehicle speed sensor 310 detects the number of rotations of a wheel (not shown) and sends a signal representing a detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal representing a detection result to engine ECU 200.

Engine ECU 200 operates by electric power supplied from an auxiliary battery 320 that is a power supply. Engine ECU 200 performs computation based on signals sent from the respective sensors and ignition switch 312 and map and program stored in ROM (Read Only Memory) 202 or SRAM (Static Random Access Memory) 204 and controls the devices so as to bring engine 100 into a desired operation state.

In the present embodiment, engine ECU 200 detects a waveform of vibration (hereafter referred to as "vibration waveform") of engine 100 in a predetermined knock detection gate (a section between a predetermined first crank angle and a predetermined second crank angle) based on the signal sent from knock sensor 300 and the crank angle and determines whether or not knocking has occurred in engine 100 based on the detected vibration waveform. The knock detection gate in the embodiment is from a top dead center (0°) to 90° in a combustion stroke. The knock detection gate is not limited to it.

Figure 2:
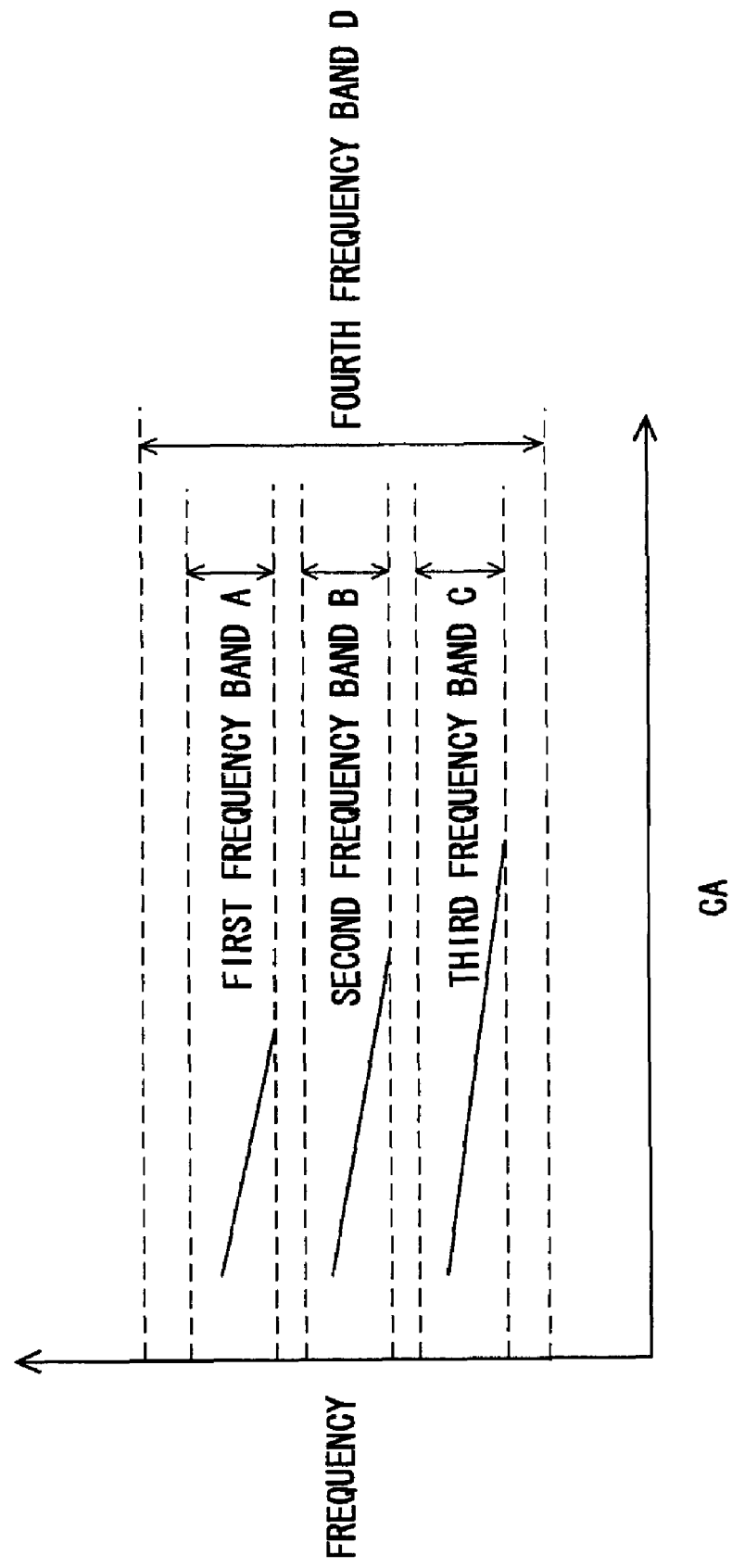
FIG. 2 is a chart showing frequency bands of vibration generated in the engine at the time of knocking.

When knocking occurs, vibration at a frequency near a frequency shown in a solid line in FIG. 2 is generated in engine 100. The frequency of the vibration generated due to the knocking is not constant and varies in a certain range of frequencies. Therefore, in the embodiment, as shown in FIG. 2, vibrations of a first frequency band A, a second frequency band B and a third frequency band C that include frequencies of vibration due to knocking are detected. Further, a fourth frequency band D that is broad and that includes first to third frequency bands A to C is detected. In FIG. 2, CA designates the crank angle. The number of frequency bands of vibrations generated due to knocking is not restricted to three.

If the bandwidth of each frequency band is broad, it is highly likely that noises other than vibration due to knocking (for example vibration due to an in-cylinder injector or an intake valve or an exhaust valve sitting on its seat) are included.

Conversely, narrowing the bandwidth in which vibration is detected, while noise components included in magnitude of vibration being detected can be suppressed, a characteristic portion of noise components (such as occurrence timing of vibration, attenuation rate and the like) is removed also from the vibration waveform. In this case, even as to vibration that is actually due to noise components, a waveform not including noise components, that is, a waveform that is similar to a waveform at the time of knocking may be detected. Therefore, the vibration at the time of knocking and the vibration due to noise components are hardly discriminated from each other based on a waveform.

Accordingly, in the embodiment, in order to precisely include vibration particular to knocking, vibration in first to third frequency bands A to C, each of which bandwidth is narrowly set, is detected.

On the other hand, in order to determine whether knocking has occurred or not considering the noise when noise occurs, vibration in a fourth frequency band D that is broad and that includes first to third frequency bands A to C is detected so as to include the noise.

Figure 3:
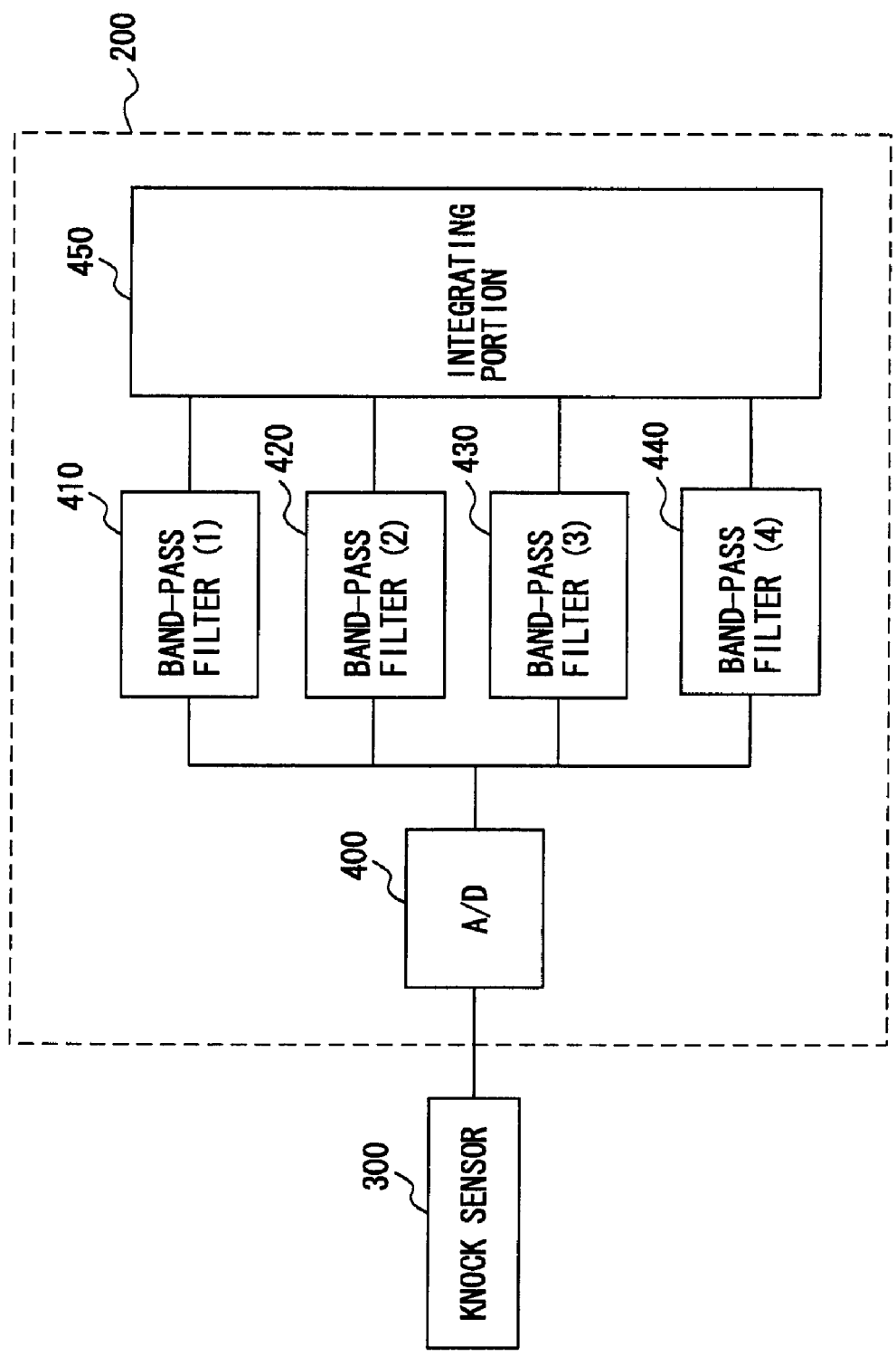
FIG. 3 is a control block diagram showing the engine ECU in FIG. 1.

With reference to FIG. 3, engine ECU 200 will be further described. Engine ECU 200 includes an A/D (analog/digital) converter 400, a band-pass filter (1) 410, a band-pass filter (2) 420, a band-pass filter (3) 430, a band-pass filter (4), and an integrating portion 450.

A/D converter 400 converts an analog signal sent from knock sensor 300 into a digital signal. Band-pass filter (1) 410 allows passage of only signals in first frequency band A out of signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B out of signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C out of signals sent from knock sensor 300. In other words, by band-pass filter (3) 430, only vibrations in third frequency band C are extracted from vibrations detected by knock sensor 300.

Band-pass filter (4) 440 allows passage of only signals in fourth frequency band D out of signals sent from knock sensor 300. In other words, by band-pass filter (4) 440, only vibrations in fourth frequency band D are extracted from vibrations detected by knock sensor 300.

Integrating portion 450 integrates signals selected by the band-pass filters (1) 410 to (4) 440, i.e., magnitudes of vibrations for a crank angle of 5° at a time. The integrated value will hereafter be referred to as an integrated value. The integrated value is calculated in each frequency band. By this calculation of the integrated value, the vibration waveform in each frequency band is detected.

Furthermore, the calculated integrated values in the first to third frequency bands A to C are added to correspond to the crank angles. In other words, the vibration waveforms of the first to third frequency bands A to C are synthesized.

Figure 4:
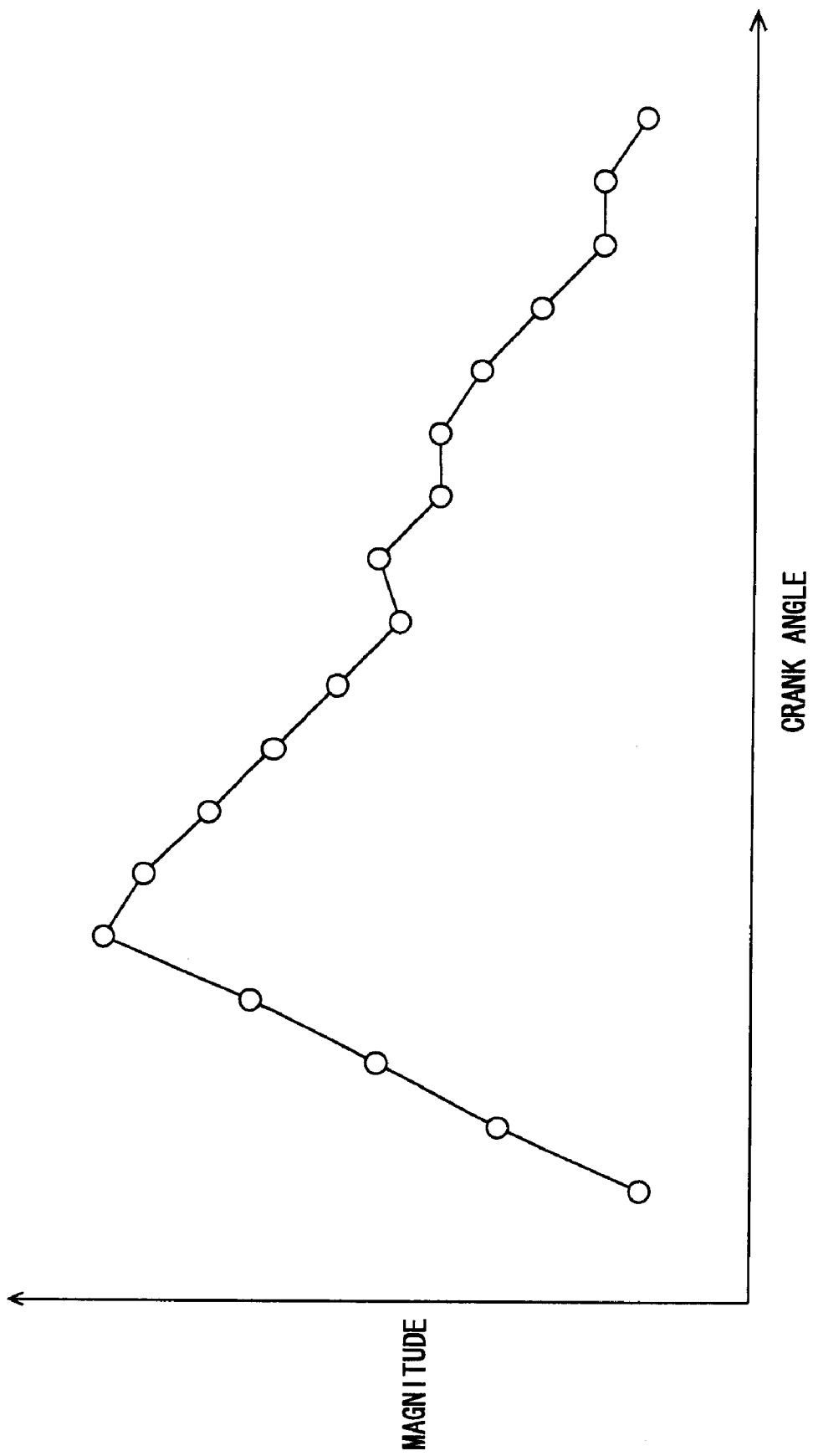
FIG. 4 is a chart showing a waveform of vibration in the engine.

As a result, as shown in FIG. 4, a vibration waveform of engine 100 is detected. In other words, the synthesized waveform of the first to third frequency bands A to C and the vibration waveform of fourth frequency band D are used as the vibration waveform of engine 100. The vibration waveform (integrated values) of fourth frequency band D is not synthesized, and it is used alone.

Figure 5:
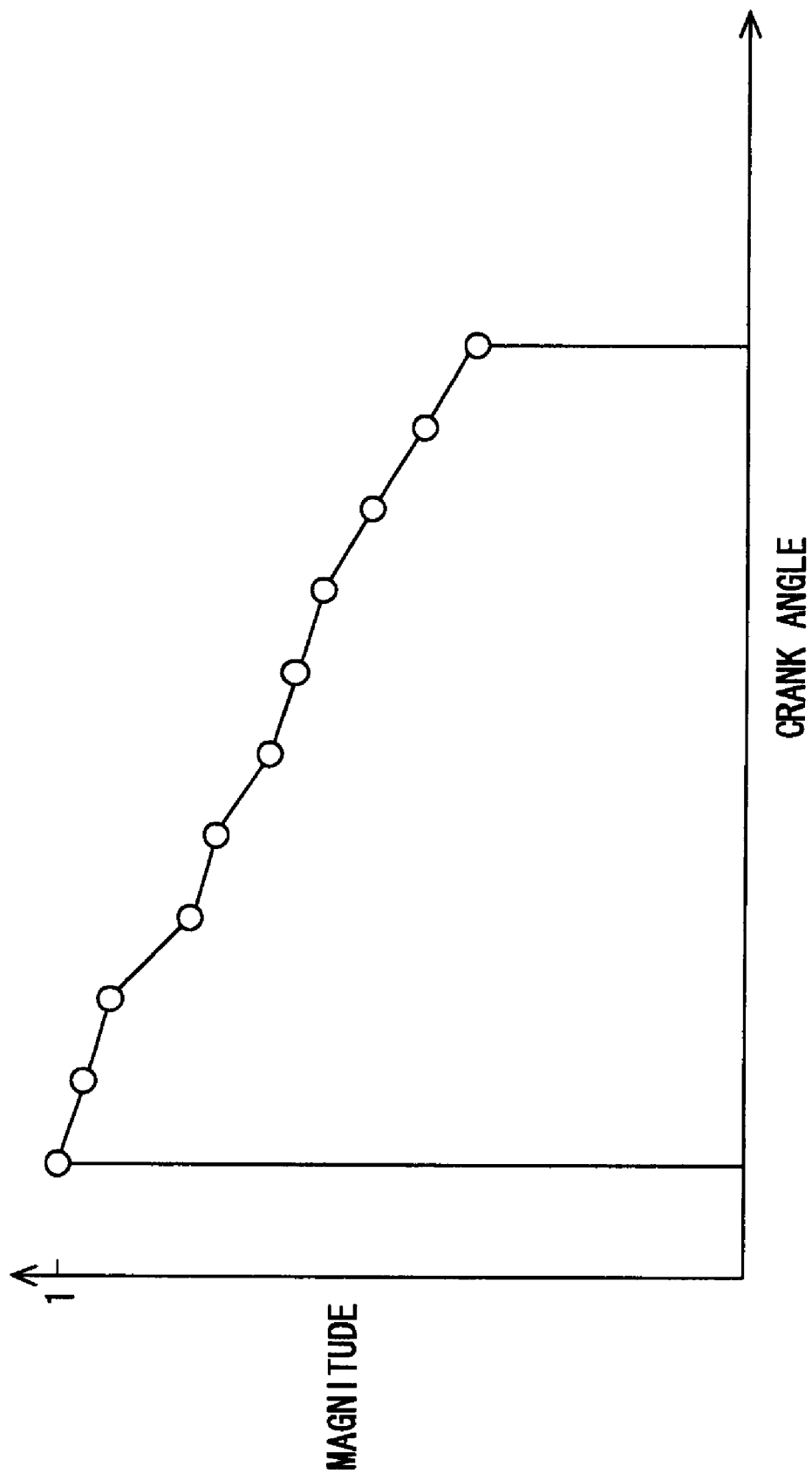
FIG. 5 is a chart showing a knock waveform model stored in ROM of the engine ECU.

Of the detected vibration waveforms, the vibration waveform of fourth frequency band D is compared with a knock waveform model stored in ROM 202 of engine ECU 200 as shown in FIG. 5. The knock waveform model is formed in advance as a model of a vibration waveform when the knocking occurs in engine 100.

In the knock waveform model, the magnitudes of the vibrations are expressed as dimensionless numbers in a range of 0 to 1 and the magnitude of the vibration does not univocally correspond to the crank angle. In other words, in the knock waveform model in the embodiment, it is determined that the magnitude of the vibration decreases as the crank angle increases after a peak value of the magnitude of the vibration, but a crank angle at which the magnitude of the vibration becomes the peak value is not determined.

The knock waveform model in the embodiment corresponds to the vibration after the peak value of the magnitude of the vibration generated due to knocking. It is also possible to store a knock waveform model corresponding to vibration after a rising edge of the vibration caused by knocking.

The knock waveform model is formed and stored in advance based on a vibration waveform of engine 100 detected when knocking is forcibly generated experimentally.

The knock waveform model is formed by using engine 100 with dimensions of engine 100 and an output value of knock sensor 300 which are median values of dimensional tolerance and tolerance of the output value of knock sensor 300 (hereafter referred to as "median characteristic engine"). In other words, the knock waveform model is a vibration waveform in a case in which knocking is forcibly generated in the median characteristic engine. A method of forming the knock waveform model is not limited to it and it is also possible to form the model by simulation.

Figure 6:
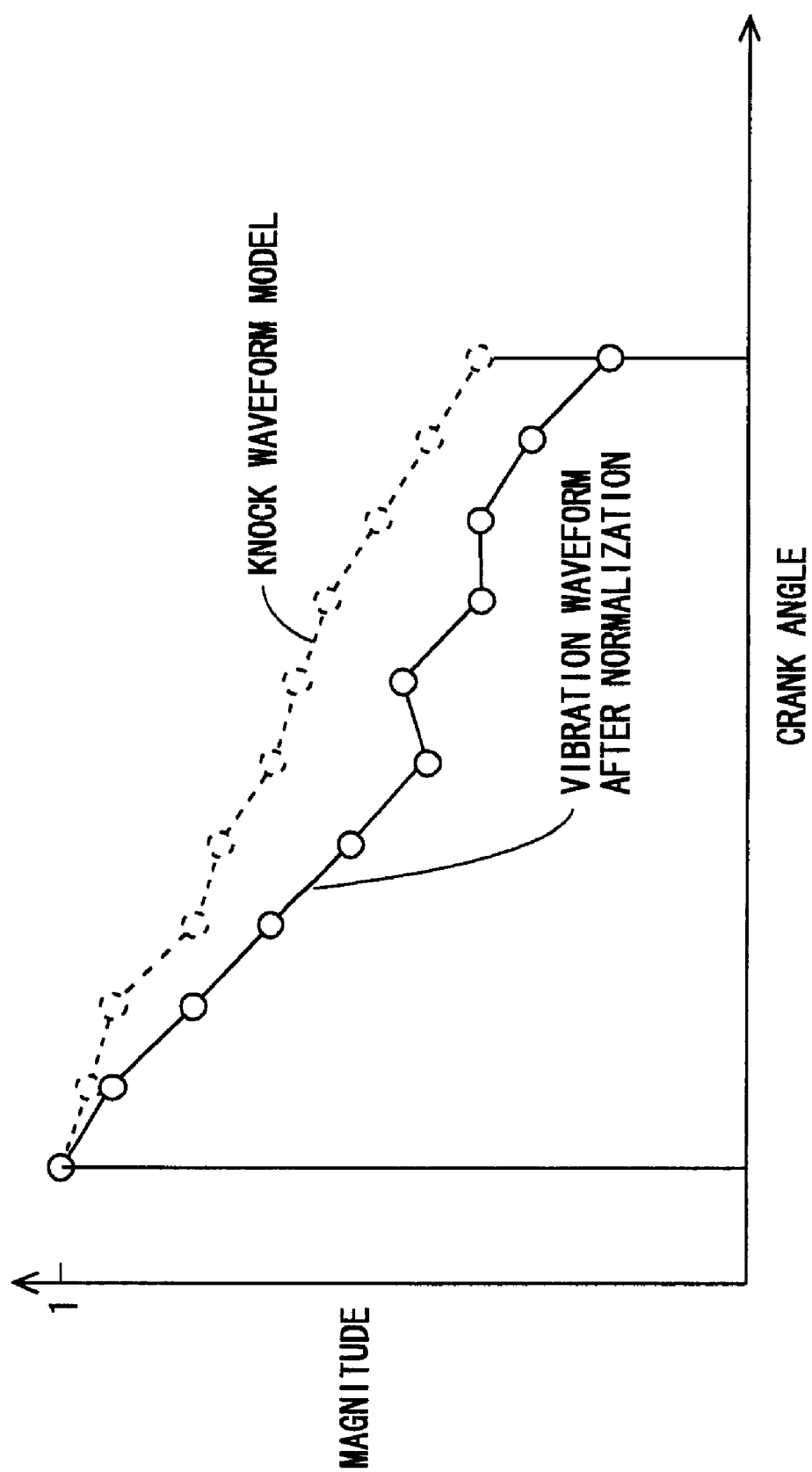
FIG. 6 is a chart (No. 1) for comparing the vibration waveform of a fourth frequency band D with the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range of 0 to 1 by dividing each integrated value by a maximum value of the integrated value in the detected vibration waveform, for example. However, a method of normalization is not limited to it.

In the embodiment, engine ECU 200 calculates a correlation coefficient K which is a value related to a deviation of the normalized vibration waveform and the knock waveform model from each other. With timing at which the magnitude of the vibration becomes a maximum value in the vibration waveform after the normalization and timing at which the magnitude of the vibration becomes a maximum value in the knock waveform model synchronized, an absolute value (deviation amount) of the deviation of the vibration waveform after the normalization and the knock waveform model from each other is calculated at each crank angle (at every 5° of crank angle) to thereby calculate correlation coefficient K.

If the absolute value of the deviation of the vibration waveform after the normalization and the knock waveform model from each other at each crank angle is $\Delta S(I)$ (I is a natural number) and a value (an area of the knock waveform model) obtained by integrating the magnitude of vibration in the knock waveform model by the crank angle is S, correlation coefficient K is calculated by an equation, $K=(S-\Sigma \Delta S(I))/S$, where $\Sigma \Delta S(I)$ is the total of $\Delta S(I)$. In the embodiment, the closer a shape of the vibration waveform to a shape of the knock waveform model, the greater value correlation coefficient K is calculated as. Therefore, if a waveform of vibration caused by factors other than the knocking is included in the vibration waveform, correlation coefficient K is calculated as a small value. A method of calculating correlation coefficient K is not limited to it.

The vibration waveform of fourth frequency band D of broad bandwidth is compared with the knock waveform model to calculate correlation coefficient K, since its waveform shape is highly precise as compared with first to third frequency bands A to C of narrow bandwidth.

Figure 7:
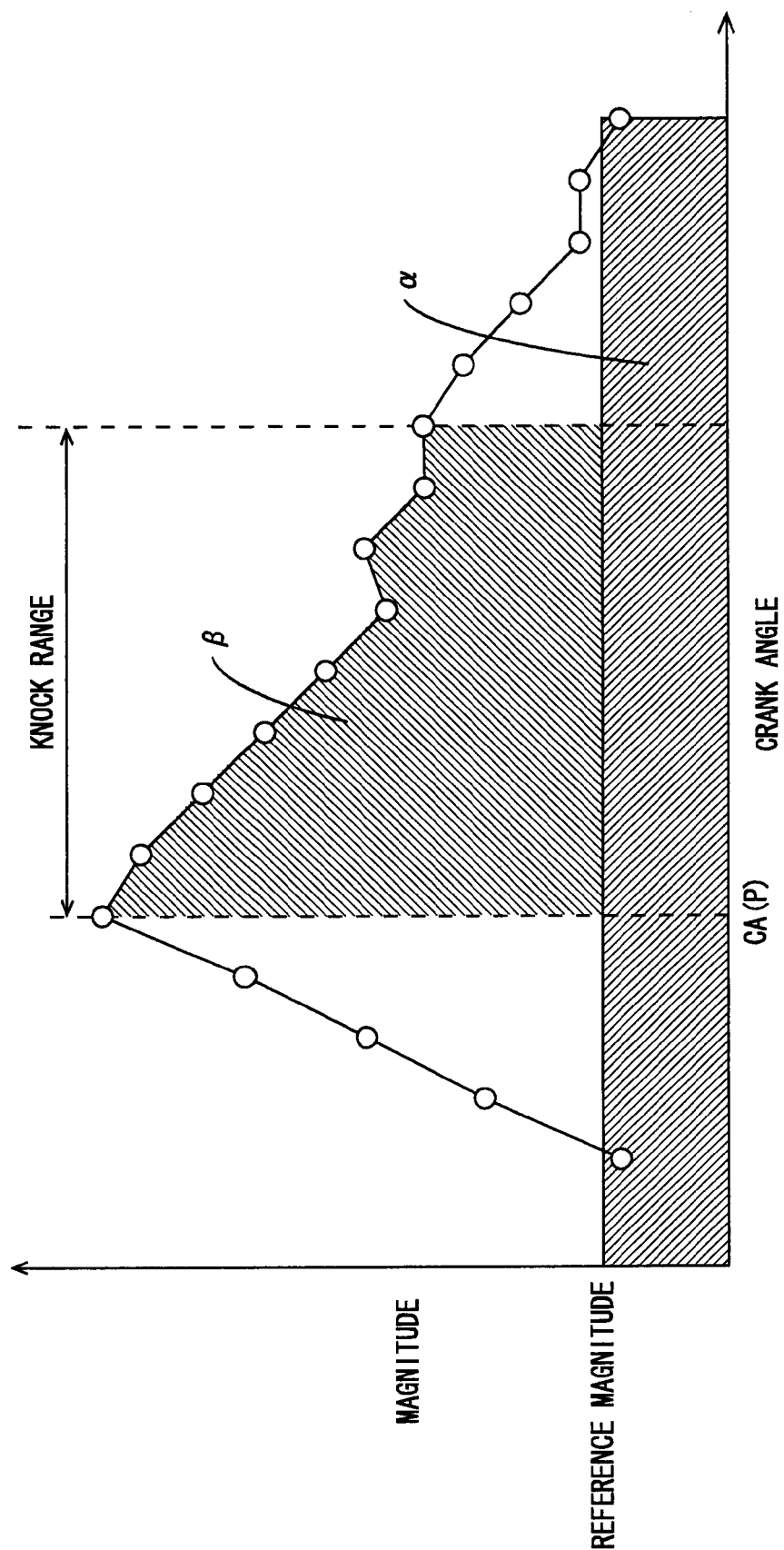
FIG. 7 is a chart (No. 1) showing a synthesized waveform of first to third frequency bands A to C used for calculating a knock magnitude N.

The synthesized waveform of first to third frequency bands A to C is used for calculating knock magnitude N. As indicated by the hatched portion in FIG. 7, knock magnitude N is calculated using a value α summing (integrating) reference magnitudes for crank angles of 90° and a portion β greater than the reference magnitude (the sum of difference between the integrated value and the reference magnitude) in a knock range defined from the crank angle CA(P) where the integrated value is at its peak (for example a range for crank angles of 40°).

That is, in the knock range where magnitude of vibration due to knocking is relatively great, portion β greater than the reference magnitude is used. In a range (other than the knock range) where magnitude of vibration due to knocking is smaller (where vibration attenuates) as compared to the knock range, the portion greater than the reference magnitude is not used to calculate knock magnitude N. A method of calculating knock magnitude N will be described later.

Figure 8:
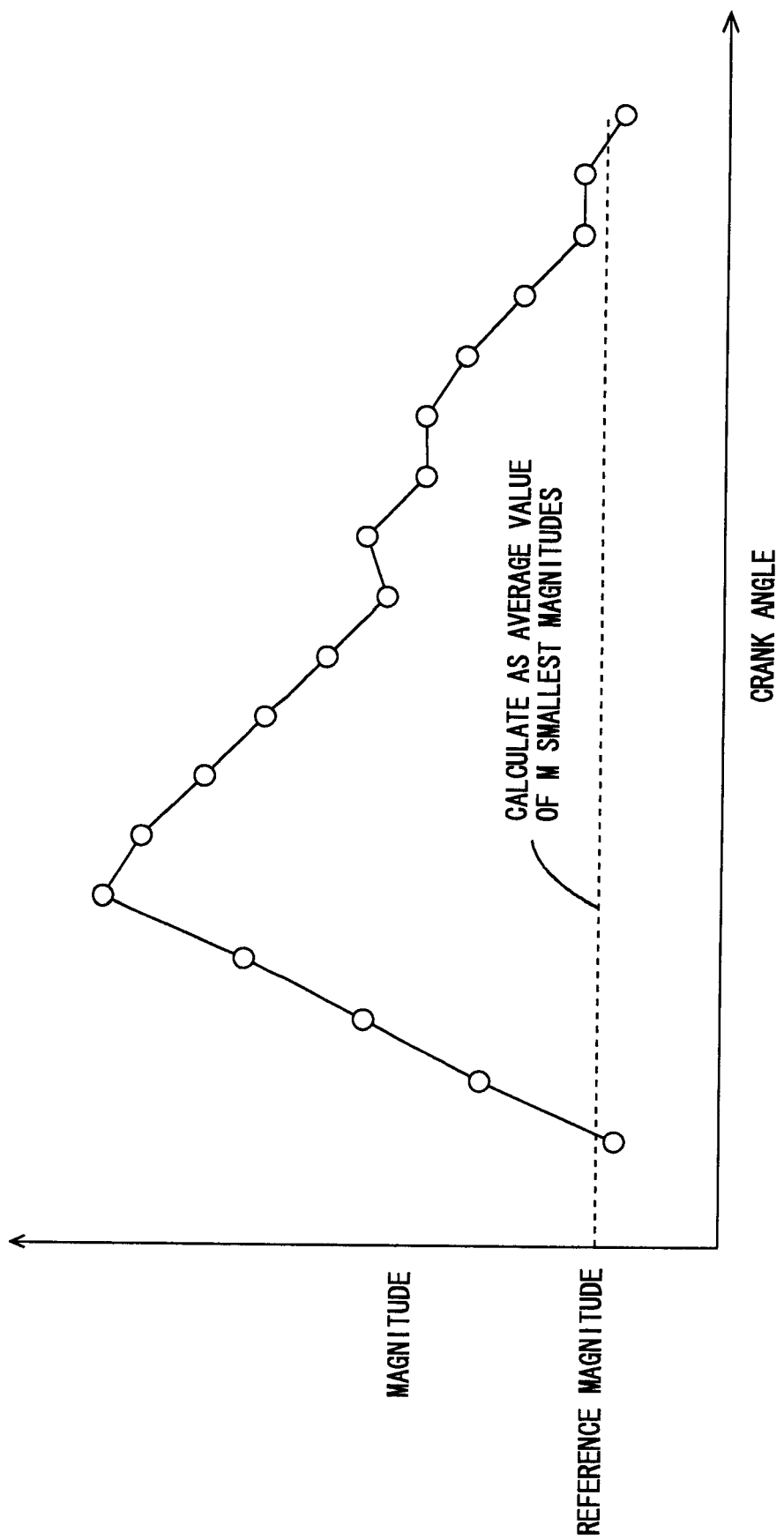
FIG. 8 is a chart showing reference magnitude calculated using integrated values in the vibration waveform of fourth frequency band D.

The reference magnitude is calculated using the integrated values of fourth frequency band D. As shown in FIG. 8, the reference magnitude is calculated as an average value of M integrated values selected placing higher priority on smaller integrated values out of the integrated values obtained as the integrated values of fourth frequency band D (where M is a natural number smaller than the number of the obtained integrated values, and for example it is "3"). The method of calculating the reference magnitude is not limited to it, and an Mth smallest integrated value may be employed as the reference magnitude.

In the embodiment, engine ECU 200 compares calculated knock magnitude N and a determination value V(KX) stored in SRAM 204 with each other, to determine whether or not knocking has occurred in engine 100 for every ignition cycle.

As shown in FIG. 9, determination values V(KX) are stored as a map for each range divided by an operation state using an engine speed NE and an intake air amount KL as parameters. In the embodiment, nine ranges for each cylinder are provided, which are divided as follows: low speed (NE<NE(1)); medium speed (NE(1)≦NE<NE(2)); high speed (NE(2)≦NE); low load (KL<KL(1)); medium load (KL(1)≦KL<KL(2)); and high load (KL(2)≦KL). The number of the ranges is not limited to it. The ranges may be divided using parameters other than engine speed NE and intake air amount KL.

At the time of shipment of engine 100 or the vehicle, a value determined in advance by an experiment or the like is used as determination value V(KX) stored in ROM 202 (an initial value of determination value V(KX) at the time of shipment). However, a magnitude of the same vibration occurring in engine 100 may be detected as different values due to variation in the output values and degradation of knock sensor 300. In this case, it is necessary to correct determination value V(KX) and to determine whether or not knocking has occurred by using determination value V(KX) corresponding to the magnitude detected actually.

Therefore, in the embodiment, a knock determination level V(KD) is calculated based on frequency distribution representing a relationship between a magnitude value LOG(V) which is a value obtained by logarithmically converting magnitudes V and a frequency (the number of times, a probability) of detection of each magnitude value LOG(V).

Magnitude value LOG(V) is calculated for each range in which engine speed NE and intake air amount KL are used as parameters. Magnitude V used for calculating magnitude value LOG(V) is a peak value (peak value of integrated values at every 5°) of magnitudes between predetermined crank angles. Based on calculated magnitude value LOG(V), median value V(50) at which the accumulative sum of frequencies of magnitudes LOG(V) from the minimum value reaches 50% is calculated. Furthermore, a standard deviation σ of magnitude values LOG(V) equal to or smaller than median value V(50) is calculated. For example, in the embodiment, a median value V(50) and a standard deviation σ, which approximate the median value and standard deviation calculated based on a plurality of magnitude values LOG (V) (e.g., 200 cycles), are calculated for each ignition cycle by the following calculation method.

If a currently detected magnitude value LOG(V) is greater than a previously calculated median value V(50), then a value obtained by adding a predetermined value C(1) to the previously calculated median value V(50) is calculated as a current median value V(50). On the other hand, if a currently detected magnitude value LOG(V) is smaller than a previously calculated median value V(50), then a value obtained by subtracting a predetermined value C(2) (e.g., C(2) and C(1) are the same value) from the previously calculated median value V(50) is calculated as a current median value V(50).

If a currently detected magnitude value LOG(V) is smaller than a previously calculated median value V(50) and greater than a value obtained by subtracting a previously calculated standard deviation σ from the previously calculated median value V(50), then a value obtained by subtracting a value twice as large as a predetermined value C(3) from the previously calculated standard deviation σ is calculated as a current standard deviation σ. On the other hand, if a currently detected magnitude value LOG(V) is greater than a previously calculated median value V(50) or smaller than a value obtained by subtracting a previously calculated standard deviation σ from the previously calculated median value V(50), then a value obtained by adding a predetermined value C(4) (e.g., C(3) and C(4) are the same value) to the previously calculated standard deviation σ is calculated as a current standard deviation σ. A method of calculating median value V(50) and standard deviation σ is not limited to it. Also, initial values of median value V(50) and standard deviation σ may be values set in advance or may be "0".

Using median value V(50) and standard deviation σ, a knock determination level V(KD) is calculated. As shown in FIG. 10, a value obtained by adding the product of a coefficient U(1) (U(1) is a constant and U(1)=3, for example) and standard deviation σ to median value V(50) is a knock determination level V(KD). A method of calculating knock determination level V(KD) is not limited to it.

Proportion (frequency) of magnitude values LOG(V) greater than knock determination level V(KD) is determined as a frequency of occurrence of knocking, and counted as knock proportion KC. If knock proportion KC is greater than a threshold value KC(0), then determination value V(KX) is corrected to be reduced by a predetermined correction amount so that the frequency of retarding ignition timing becomes higher. If knock proportion KC is smaller than threshold value KC(0), then determination value V(KX) is corrected to be increased by a predetermined correction amount so that the frequency of advancing ignition timing becomes higher. The corrected determination value V(KX) is stored in SRAM 204.

Coefficient U(1) is a coefficient obtained based on data and findings obtained by experiments and the like. Magnitude value LOG(V) greater than knock determination level V(KD) when U(1)=3 substantially agrees with magnitude value LOG(V) in an ignition cycle in which knocking has actually occurred. It is also possible to use other values than "3" as coefficient U(1).

Figure 12:
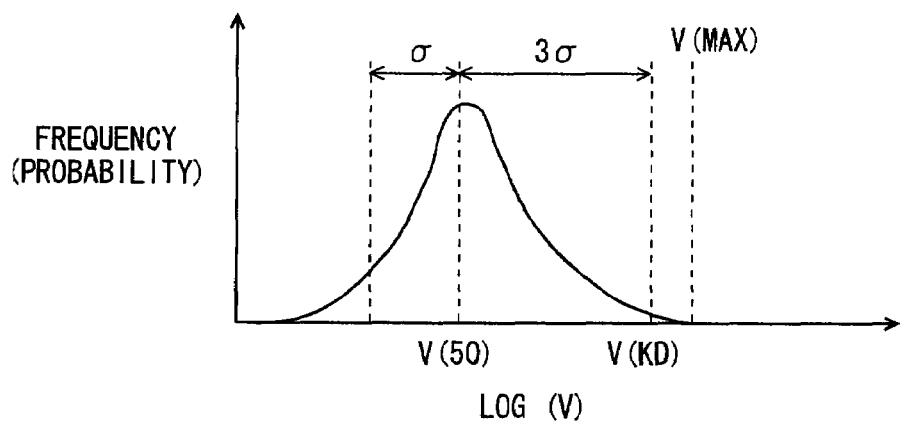
FIG. 12 is a chart (No. 3) showing frequency distribution of magnitude values LOG(V)

If knocking is not occurring in engine 100, the frequency distribution of magnitude values LOG(V) becomes normal distribution as shown in FIG. 11, and maximum value V(MAX) of magnitude value LOG(V) and knock determination level V(KD) agree with each other. On the other hand, when a greater magnitude V is detected and a greater magnitude value LOG(V) is calculated by the occurrence of knocking, as shown in FIG. 12, maximum value V(MAX) becomes greater than knock determination level V(KD).

Figure 13:
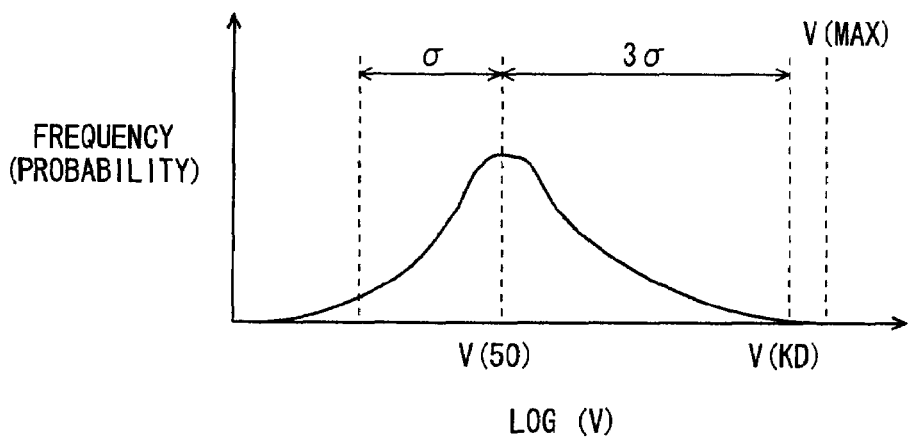
FIG. 13 is a chart (No. 4) showing frequency distribution of magnitude values LOG(V)

When the frequency of occurrence of knocking becomes further higher, as shown in FIG. 13, maximum value V(MAX) becomes further greater. Median value V(50) and standard deviation a in the frequency distribution become greater as maximum value V(MAX) does. As a result, knock determination level V(KD) becomes greater.

A magnitude value LOG(V) smaller than knock determination level V(KD) is not determined as a magnitude value LOG(V) in a cycle in which knocking has occurred. Therefore, as knock determination level V(KD) becomes greater, the frequency of determining that knocking has not occurred while knocking has actually occurred becomes greater.

Figure 14:
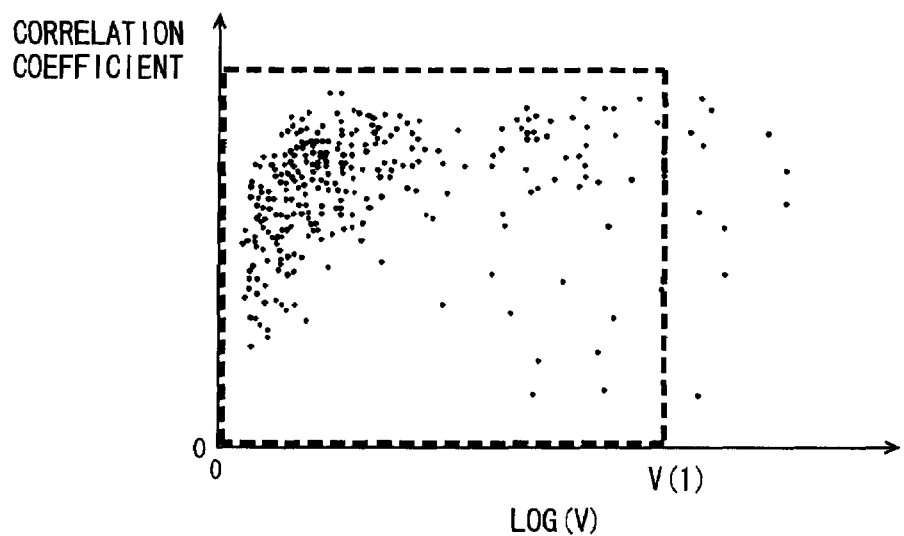
FIG. 14 is a chart showing magnitude values LOG(V) used for forming the frequency distribution of the magnitude values LOG(V)

Therefore, in the embodiment, magnitude values LOG(V) in a range surrounded with a broken line in FIG. 14 are used to exclude magnitude values LOG(V) greater than a threshold value V(1), to thereby obtain median value V(50) and standard deviation σ. FIG. 14 is a chart in which calculated magnitude values LOG(V) are plotted for each correlation coefficient K in a cycle in which the magnitude values LOG (V) are obtained.

Threshold value V(1) is a value obtained by adding, to a median value of frequency distribution of magnitude values LOG(V), the product of a coefficient U(2) (U(2) is a constant and U(2)=3, for example) and a standard deviation of magnitude values LOG(V) equal to or smaller than the median value.

By extracting only magnitude values LOG(V) smaller than threshold value V(1) to calculate median value V(50) and standard deviation σ, median value V(50) and standard deviation σ do not become excessively great, and become stable values. As a result, knock determination level V(KD) can be suppressed from becoming excessively high. Therefore, the frequency of determining that knocking has not occurred while knocking has actually occurred can be suppressed from becoming high.

The method of extracting magnitude values LOG(V) used for calculating median value V(50) and standard deviation σ is not limited to it. For example, out of magnitude values LOG(V) smaller than threshold value V(1) described above, magnitude values LOG(V) calculated in the ignition cycles in which correlation coefficient K is greater than threshold value K(1) may be extracted.

Figure 15:
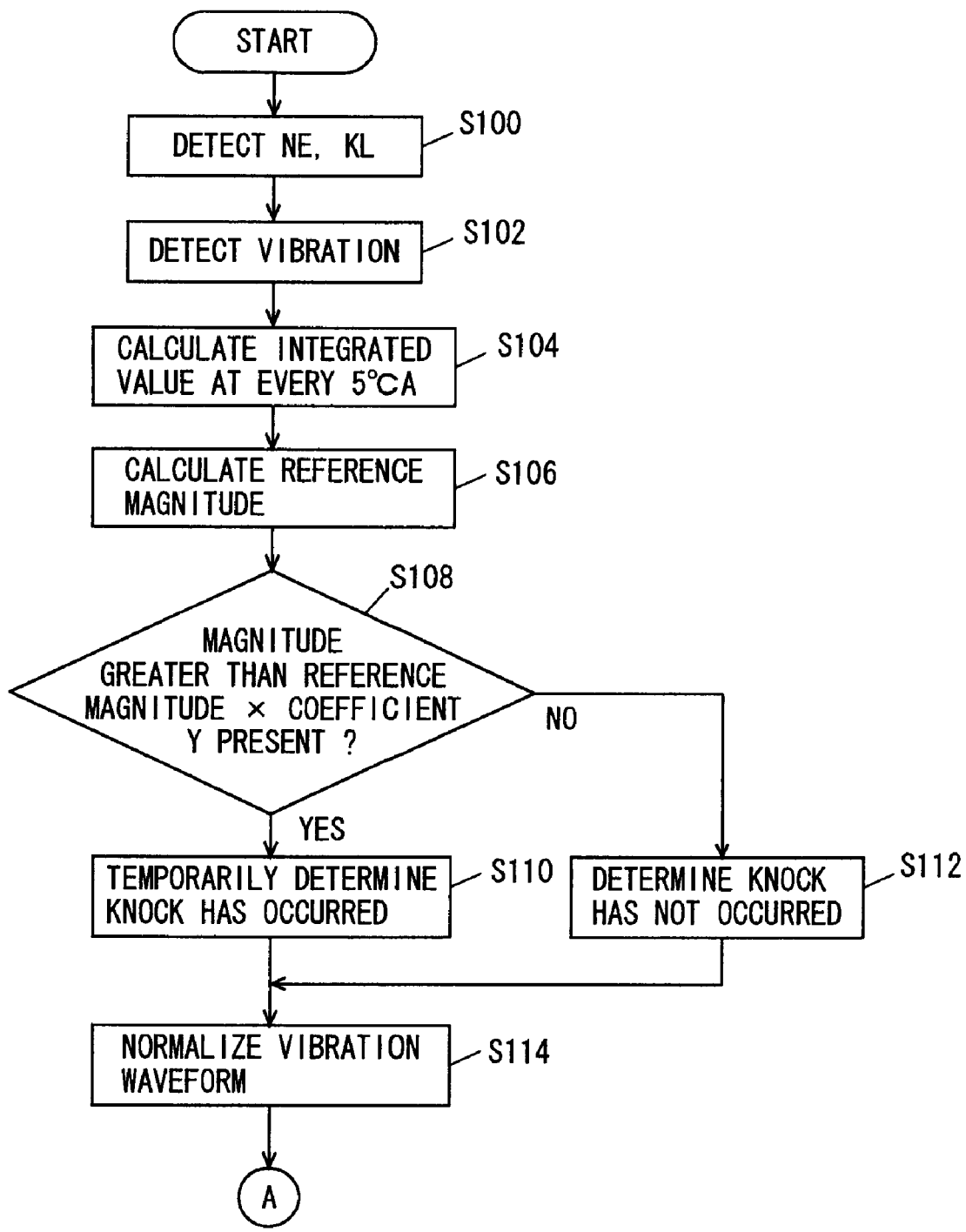
FIG. 15 is a flowchart (No. 1) showing a control structure of a program executed by the engine ECU which is the knocking determination device according to the embodiment of the present invention.
Figure 16:
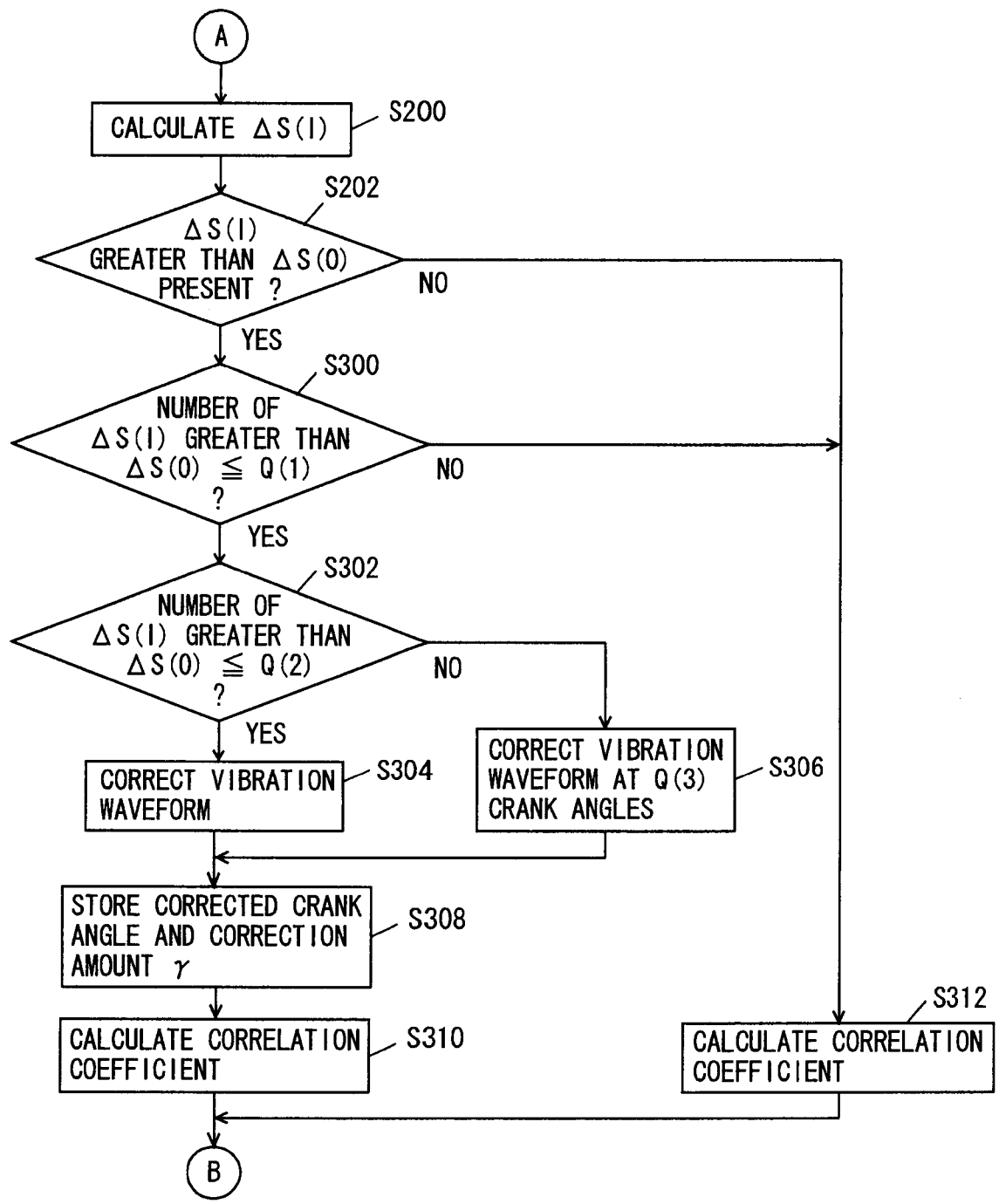
FIG. 16 is a flowchart (No. 2) showing the control structure of the program executed by the engine ECU which is the knocking determination device according to the embodiment of the present invention.
Figure 17:
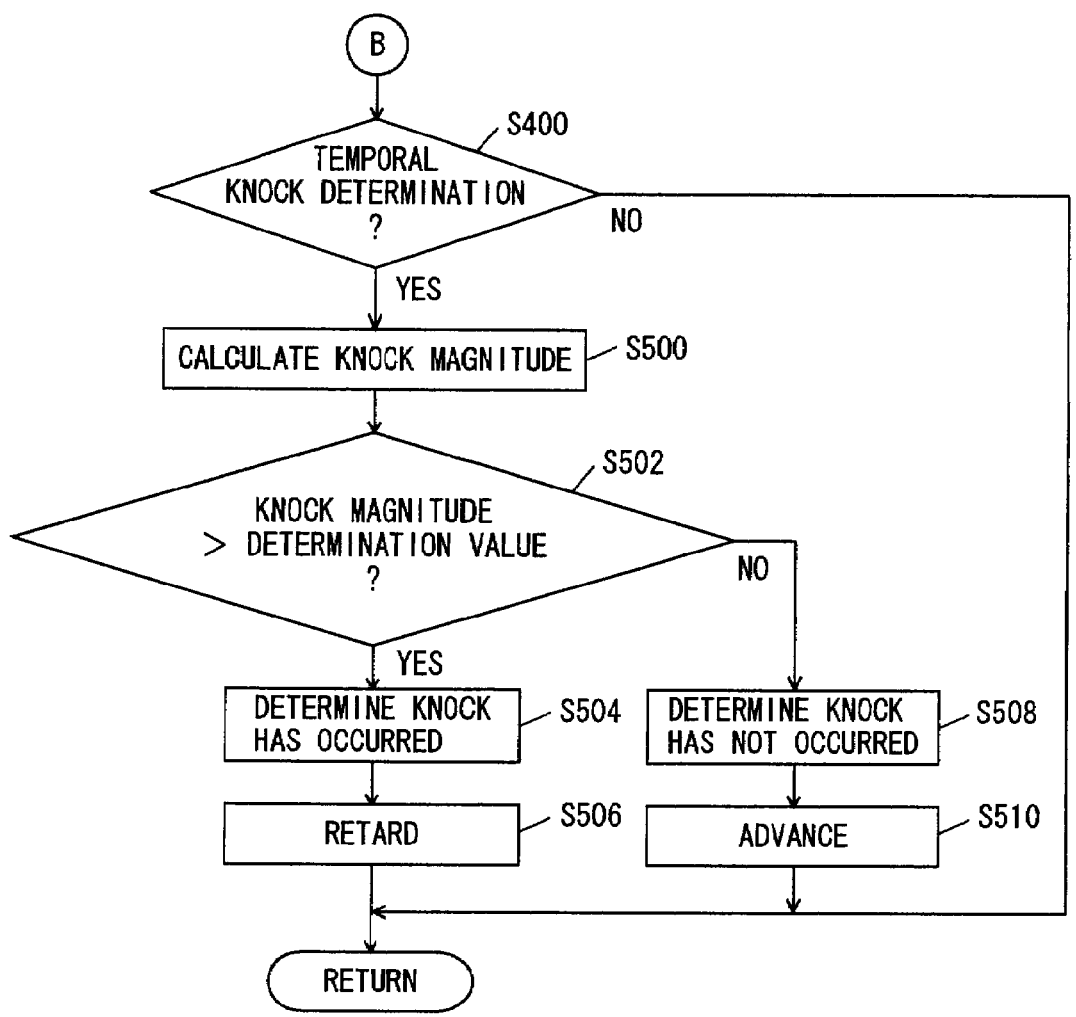
FIG. 17 is a flowchart (No. 3) showing the control structure of the program executed by the engine ECU which is the knocking determination device according to the embodiment of the present invention.

With reference to FIGS. 15 to 17, a control structure of a program executed by engine ECU 200 which is the knocking determination device according to the embodiment so as to control the ignition timing by determining whether or not knocking has occurred in each ignition cycle will be described.

In step 100 (hereafter "step" will be abbreviated to "S"), engine ECU 200 detects engine speed NE based on a signal sent from crank position sensor 306 and detects intake air amount KL based on a signal sent from air flow meter 314.

In S102, engine ECU 200 detects magnitude of vibration of engine 100 based on a signal sent from knock sensor 300. The magnitude of the vibration is expressed as an output voltage of knock sensor 300. The magnitude of the vibration may be expressed as a value corresponding to the output voltage of knock sensor 300. Detection of the magnitude is carried out between the top dead center and 90° (a crank angle of 90°) in a combustion stroke.

In S104, engine ECU 200 calculates a value (integrated value) obtained by integrating output voltages (values representing magnitudes of vibrations) of knock sensor 300 for every 5° of crank angle (for crank angles of 5°). The integrated value is calculated for vibrations in each of first to fourth frequency bands A to D. Here, integrated values in the first to third frequency bands A to C are added to correspond to the crank angles. In other words, the vibration waveforms of the first to third frequency bands A to C are synthesized.

In S106, engine ECU 200 calculates a reference magnitude as an average value of M integrated values which are selected out of the integrated values of fourth frequency band D placing higher priority on smaller integrated values.

In S108, engine ECU 200 determines whether there is an integrated value greater than a product of the reference magnitude and a coefficient Y (Y is a positive value, for example "2") among the integrated values of fourth frequency band D between the top dead center and CA(A) of crank angle (CA (A)<90°, for example 45°).

When there is an integrated value greater than the product of the reference magnitude and coefficient Y (YES in S108), the processing moves to S110. Otherwise (NO in S108), the processing moves to S112.

In S110, engine ECU 200 temporarily determines that knocking has occurred. In S112, engine ECU 200 determines that knocking has not occurred.

In S114, engine ECU 200 normalizes the vibration waveform of fourth frequency band D. Here, normalization means to express the magnitude of the vibration as a dimensionless number in a range of 0 to 1 by dividing each integrated value by the calculated peak value.

In S200, engine ECU 200 calculates an absolute value $\Delta S(I)$ of the deviation of the vibration waveform of fourth frequency band D after the normalization and the knock waveform model from each other at each crank angle.

In S202, engine ECU 200 determines whether or not $\Delta S(I)$ greater than threshold value $\Delta S(0)$ is present. When $\Delta S(I)$ greater than threshold value $\Delta S(0)$ is present (YES in S202), the processing moves to S300. Otherwise (NO in S202), the processing moves to S312.

In S300, engine ECU 200 determines whether or not the number of $\Delta S(I)$ greater than threshold value $\Delta S(0)$ is equal to or smaller than a predetermined number Q(1). When the number of $\Delta S(I)$ greater than threshold value $\Delta S(0)$ is equal to or smaller than predetermined number Q(1) (YES in S300), the processing moves to S302. Otherwise (NO in S300), the processing moves to S312.

In S302, engine ECU 200 determines whether or not the number of $\Delta S(I)$ greater than threshold value $\Delta S(0)$ is equal to or smaller than a predetermined number Q(2). When the number of $\Delta S(I)$ greater than threshold value $\Delta S(0)$ is equal to or smaller than predetermined number Q(2) (YES in S302), the processing moves to S304. Otherwise (NO in S302), the processing moves to S306.

In S304, engine ECU 200 corrects the normalized vibration waveform so that the magnitude agrees with the magnitude of the knock waveform model (so that $\Delta S(I)$ is reduced to "0") at crank angles where $\Delta S(I)$ is greater than threshold value $\Delta S(0)$.

In S306, engine ECU 200 corrects the normalized vibration waveform so that the magnitude agrees with the magnitude of the knock waveform model (so that $\Delta S(I)$ is reduced to "0") at Q(3) (Q(3)<Q(1)) of crank angle(s), placing higher priority on crank angles having greater $\Delta S(I)$ among the crank angles where $\Delta S(I)$ is greater than threshold value $\Delta S(0)$.

In S308, engine ECU 200 stores the crank angle(s) where correction was conducted and the amount of the correction (a product of $\Delta S(I)$ and the peak value of the integrated values) γ in SRAM 204.

In S310, engine ECU 200 compares the corrected vibration waveform with the knock waveform model, and calculates correlation coefficient K which is a value related to the deviation of the corrected vibration waveform and the knock waveform model from each other.

In S312, engine ECU 200 compares the normalized vibration waveform (that is not corrected) with the knock waveform model, and calculates correlation coefficient K which is a value related to the deviation of the normalized vibration waveform and the knock waveform model from each other.

In S400, engine ECU 200 determines whether or not it has temporarily been determined that knocking had occurred. When it has temporarily been determined that knocking had occurred (YES in S400), the processing moves to S500. Otherwise (NO in S400), the processing ends.

In S500, engine ECU 200 calculates knock magnitude N. Knock magnitude N is calculated using the synthesized waveform of first to third frequency bands A to C. As indicated by the hatched portion in FIG. 7, knock magnitude N is calculated by an equation, $$N=(\alpha+(\beta-\gamma)\times K)/\alpha \tag{1}$$

using α that is a value obtained by summing (integrating) reference magnitudes for crank angles of 90° (for the knock detection gate), β that is a portion greater than the reference magnitude in a knock range defined from the crank angle CA(P) where the integrated value is at its peak, γ that is a correction amount of the vibration waveform, and K that is a correlation value K. Here, if correction of the vibration waveform has not been conducted, knock magnitude N is calculated employing γ=0.

In S502, engine ECU 200 determines whether knock magnitude N is greater than determination value V(KX). When knock magnitude N is greater than determination value V(KX) (YES in S502), the processing moves to S504. Otherwise (NO in S502), the processing moves to S508.

In S504, engine ECU 200 determines that knocking has occurred in engine 100. In S506, engine ECU 200 retards the ignition timing.

In S508, engine ECU 200 determines that knocking has not occurred in engine 100. In S510, engine ECU 200 advances the ignition timing.

Operation of engine ECU 200 which is the knocking determination device according to the embodiment based on the above configuration and flowcharts will be described. In the following description, it is assumed that the above-described predetermined number Q(1) is "3", Q(2) is "2", and Q(3) is "1".

During an operation of engine 100, engine speed NE is detected based on the signal sent from crank position sensor 306 and intake air amount KL is detected based on the signal sent from air flow meter 314 (S100). Moreover, based on the signal sent from knock sensor 300, a magnitude of vibration of engine 100 is detected (S102).

Between the top dead center and 90° in the combustion stroke, the integrated value for every 5° of vibrations in each of the first to fourth frequency bands A to D is calculated (S104). The calculated integrated values in the first to third frequency bands A to C are added to correspond to the crank angles to thereby synthesize a vibration waveform.

Of those waveforms, the vibration waveform of fourth frequency band D and knock waveform model are compared with each other to thereby calculate correlation coefficient K, which is used in determining whether knocking is present or absent for every ignition cycle. On the other hand, sometimes a waveform in a shape similarly to that of a waveform at the time of knocking is obtained, even when knocking has not occurred and the vibration magnitude is small. In such a case, it may erroneously be determined that knocking has occurred, even though knocking has not occurred. Accordingly, whether knocking is present or absent is temporarily determined based on the integrated values (magnitude) of the vibration of fourth frequency band D.

In order to temporarily determine whether knocking is present or absent, a reference magnitude is calculated as an average value of M integrated values which are selected out of the integrated values of fourth frequency band D placing higher priority on smaller integrated values (S106). Thus, the reference magnitude that may not be due to knocking or noise and that may be the mechanical vibration of engine 100 itself can be calculated. Accordingly, the reference magnitude suitable for individual engine 100 can be obtained.

Figure 18:
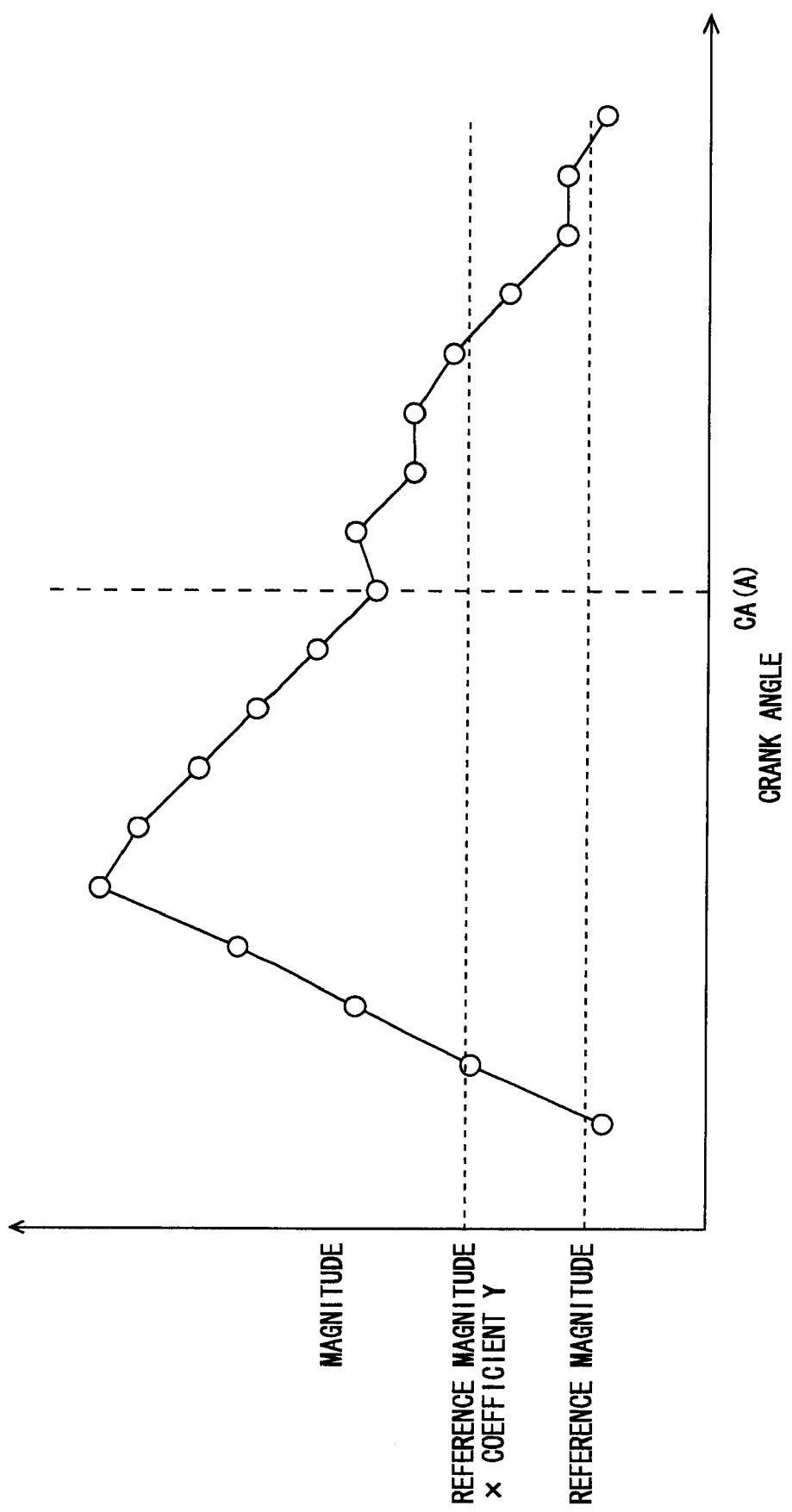
FIG. 18 is a chart showing a vibration waveform of fourth frequency band D.

Here, knocking has such a characteristic that it occurs at approximately the same crank angle around the top dead center, and that the magnitude of vibration due to knocking attenuates after the occurrence of knocking. Therefore, as shown in FIG. 18, when knocking has occurred, the integrated values of the vibration due to knocking can be relatively high between the crank angles of the top dead center (the start of the knock detection gate) and CA(A). That is, the magnitude of vibration due to knocking can be relatively great.

On the other hand, the integrated values of the vibration due to knocking can be relatively small between the crank angles of CA(A) and the end of knock detection gate. That is, the magnitude of the vibration due to knocking can be relatively small.

Accordingly, as shown in FIG. 18, when there is an integrated value greater than a product of the reference magnitude and coefficient Y between the crank angles of the top dead center and CA(A) (YES in S 108), it can be regarded that it is likely that knocking has occurred. Therefore, it is temporarily determined that knocking has occurred (S110).

On the other hand, when there is no integrated value greater than the product of the reference magnitude and coefficient Y between the crank angles of the top dead center and CA(A) (NO in S108), it can be regarded that it is extremely unlikely that knocking has occurred. Therefore, it is determined that knocking has not occurred (S112).

Thereafter, irrespective of whether temporal determination that knocking has occurred is made, the vibration waveform of fourth frequency band D is normalized (S114). By normalization, the magnitudes of the vibrations in the vibration waveform are expressed as dimensionless numbers in a range of 0 to 1. In this manner, it is possible to compare the detected vibration waveform and the knock waveform model with each other irrespective of the magnitude of vibration. Therefore, it is unnecessary to store the large number of knock waveform models corresponding to the magnitudes of the vibrations to thereby facilitate forming of the knock waveform model.

With timing at which the magnitude of the vibration becomes a maximum value in the vibration waveform after the normalization and timing at which the magnitude of the vibration becomes a maximum value in the knock waveform model synchronized (see FIG. 6), an absolute value $\Delta S(I)$ of the deviation of the vibration waveform after the normalization and the knock waveform model from each other at each crank angle is calculated (S200).

Figure 19:
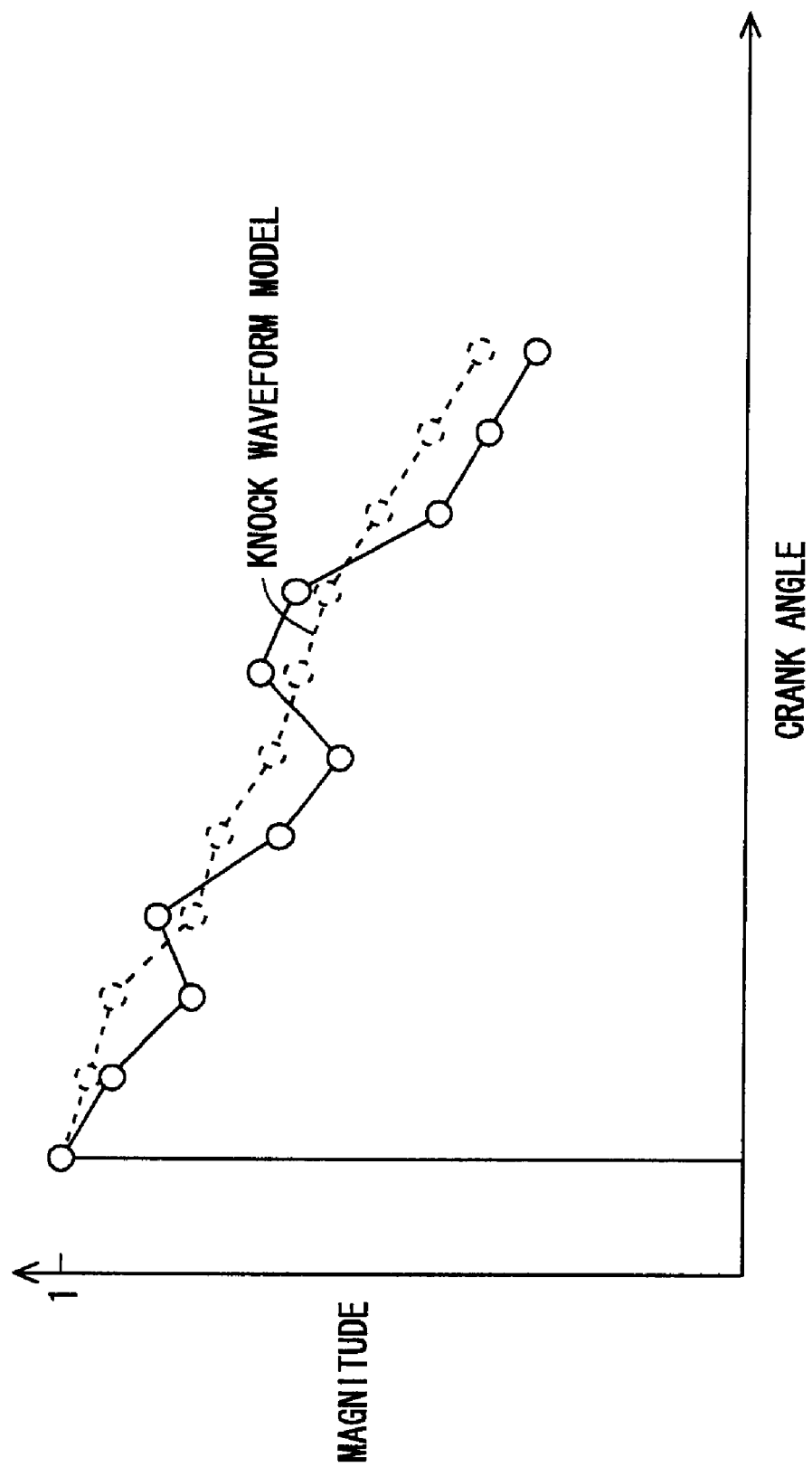
FIG. 19 is a chart (No. 2) for comparing the vibration waveform of fourth frequency band D with the knock waveform model.

Here, as shown in FIG. 19, since a vibration waveform that approximates the knock waveform model is obtained, when there is no $\Delta S(I)$ greater than threshold value $\Delta S(0)$ (NO in S202), it is considered that the obtained vibration waveform does not include vibration due to noise (vibration due to the actuation of intake valve 116, exhaust valve 118, injector 104 (in particular, an in-cylinder direct injector that directly injects fuel inside a cylinder), pump 120 (in particular, a high-pressure pump that supplies fuel to the injector) other than knocking.

Here, based on the total of calculated $\Delta S(I)$, i.e., $\Sigma \Delta S(I)$ and value S obtained by integrating the magnitude of the vibration in the knock waveform model by the crank angle, correlation coefficient K is calculated by $K=(S-\Sigma\Delta S(I))/S$ (S312).

In this manner, it is possible to convert a degree of agreement between the detected vibration waveform and the knock waveform model into a number to objectively determine the degree. Furthermore, by comparing the vibration waveform and the knock waveform model with each other, it is possible to analyze whether or not the vibration is a vibration at the time of knocking from behavior of the vibration such as an attenuating trend of the vibration.

Meanwhile, it is known that vibration due to noise of intake valve 116, exhaust valve 118, injector 104, pump 120 and the like has such characteristics that it is great in magnitude but attenuates more quickly than vibration due to knocking. That is, an occurrence period of vibration due to noise is shorter than that of vibration due to knocking.

Figure 20:
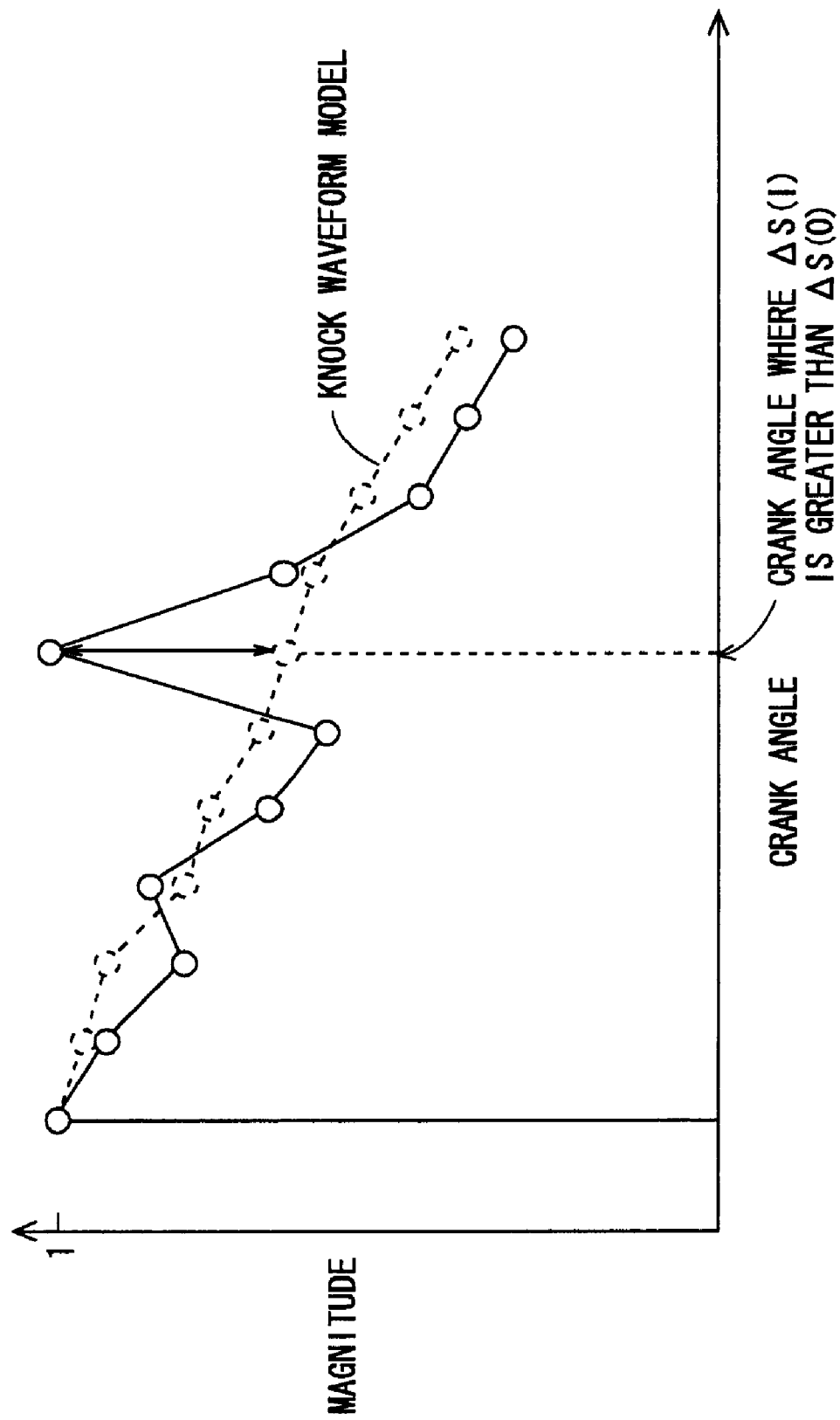
FIG. 20 is a chart (No. 3) for comparing the vibration waveform of fourth frequency band D with the knock waveform model.

Accordingly, as shown in FIG. 20, when a vibration waveform that approximates the knock waveform model is obtained but there is $\Delta S(I)$ greater than threshold value $\Delta S(0)$ (YES in S202) in the number equal to or smaller than "3" (YES in S300), it is considered that the obtained vibration waveform may include vibration due to noise.

In particular, when the number of $\Delta S(I)$ greater than threshold value $\Delta S(0)$ is equal to or smaller than "2" (YES in S302), it is considered that it is highly possible for the obtained vibration waveform to include vibration due to noise.

In this case, if the obtained vibration waveform as it stands is simply compared with the knock waveform model, an erroneous determination that knocking has not occurred while knocking has occurred may be made because great $\Delta S(I)$ is present.

Figure 21:
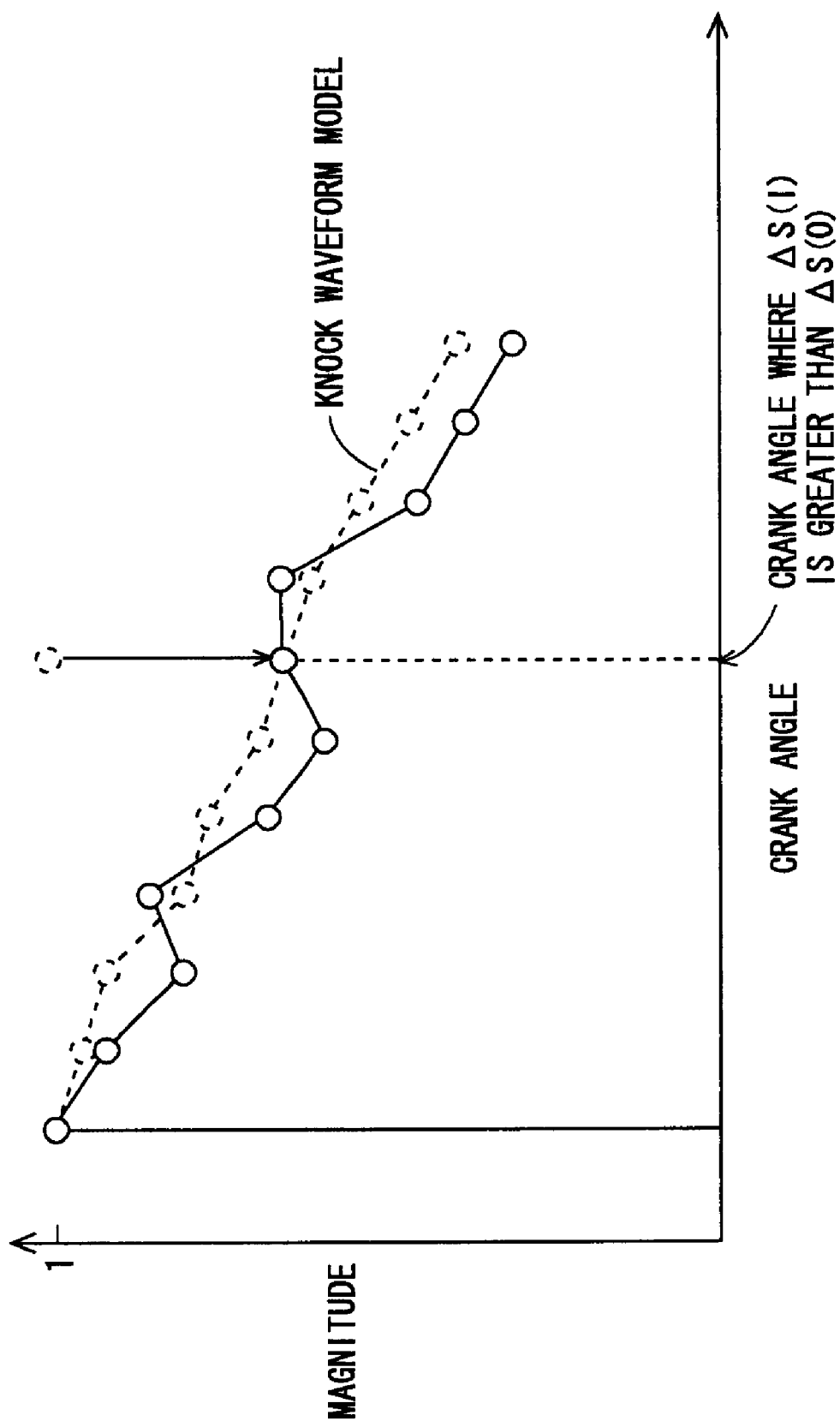
FIG. 21 is a chart (No. 4) for comparing the vibration waveform of fourth frequency band D with the knock waveform model.

Then, as shown in FIG. 21, vibration waveform is corrected so that the magnitude agrees with the magnitude of knock waveform model at crank angles where $\Delta S(I)$ is greater than threshold value $\Delta S(0)$ (S304).

Thus, the effect of vibration due to noise included in the vibration waveform can be suppressed. As a result, an erroneous determination that knocking has not occurred while knocking has occurred can be suppressed.

Figure 22:
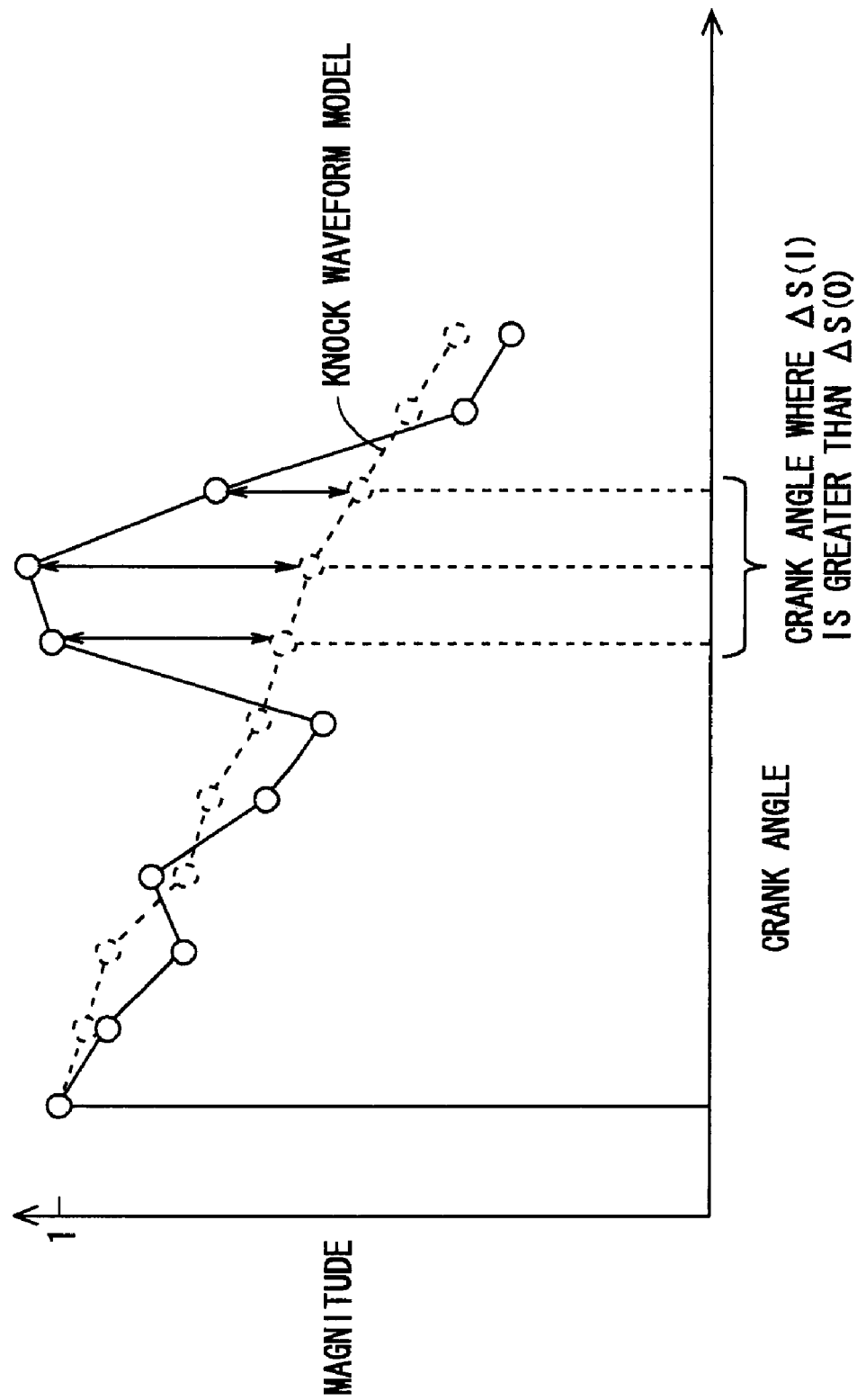
FIG. 22 is a chart (No. 5) for comparing the vibration waveform of fourth frequency band D with the knock waveform model.

On the other hand, as shown in FIG. 22, when the number of $\Delta S(I)$ greater than threshold value $\Delta S(0)$ is equal to or smaller than "3" (YES in S300) and more than "2" (NO in S302), it is possible for the obtained vibration waveform to include or not to include vibration due to noise.

Figure 23:
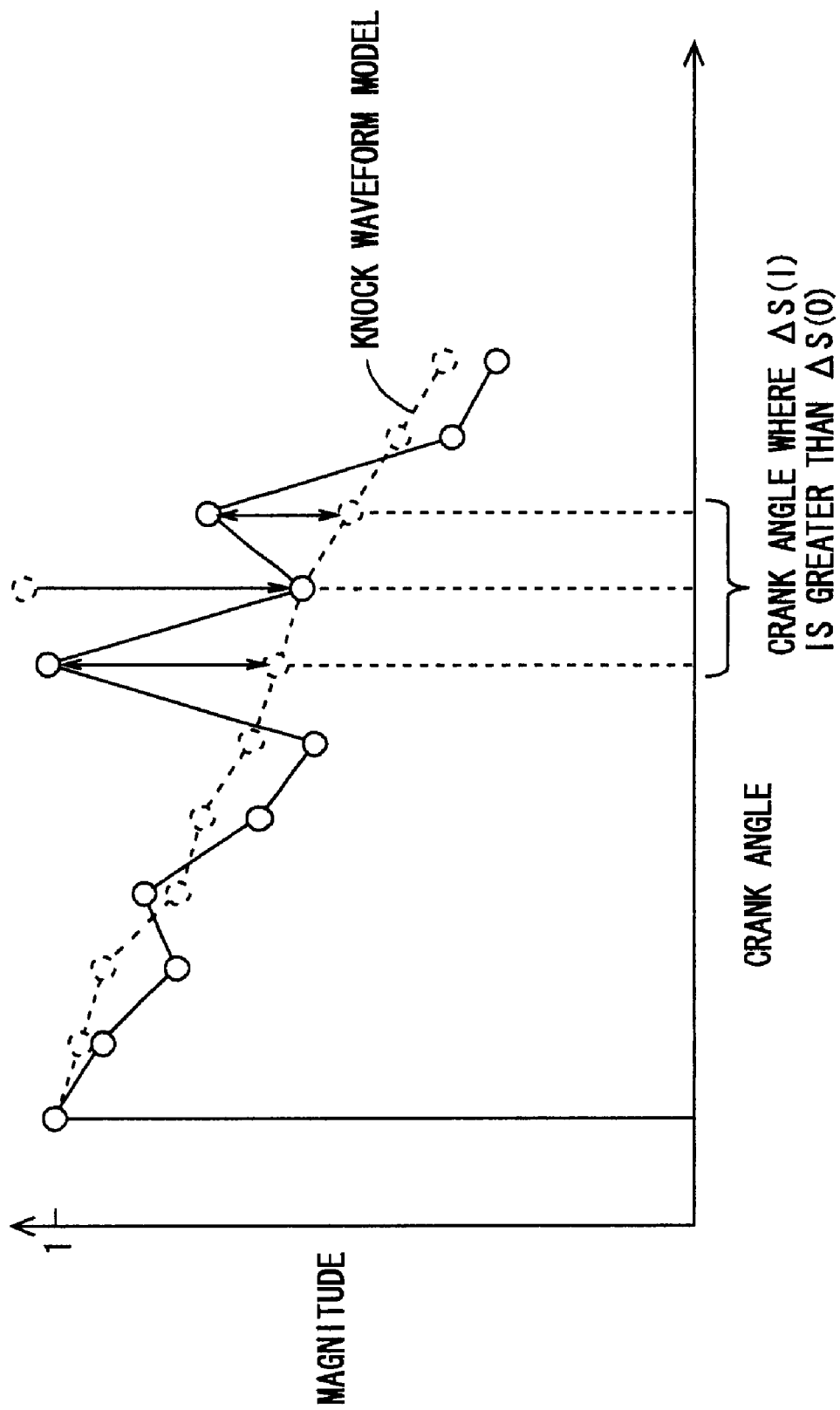
FIG. 23 is a chart (No. 6) for comparing the vibration waveform of fourth frequency band D with the knock waveform model.

If the vibration waveform is corrected in such a case, an erroneous determination that knocking has occurred while knocking has not occurred can be made. Accordingly, in this case, as shown in FIG. 23, vibration waveform is corrected so that the magnitude agrees with the magnitude of knock waveform model at "one" crank angle, placing higher priority on crank angles having greater $\Delta S(I)$ among the crank angles where $\Delta S(I)$ is greater than threshold value $\Delta S(0)$ (S306). Thus, undue correction to the vibration waveform can be suppressed. As a result, an erroneous determination that knocking has occurred while knocking has not occurred can be suppressed.

The crank angle(s) where correction was conducted and the amount of the correction γ is stored in SRAM 204 (S308). The corrected vibration waveform and the knock waveform model are compared with each other to calculate correlation coefficient K (S310).

Figure 24:
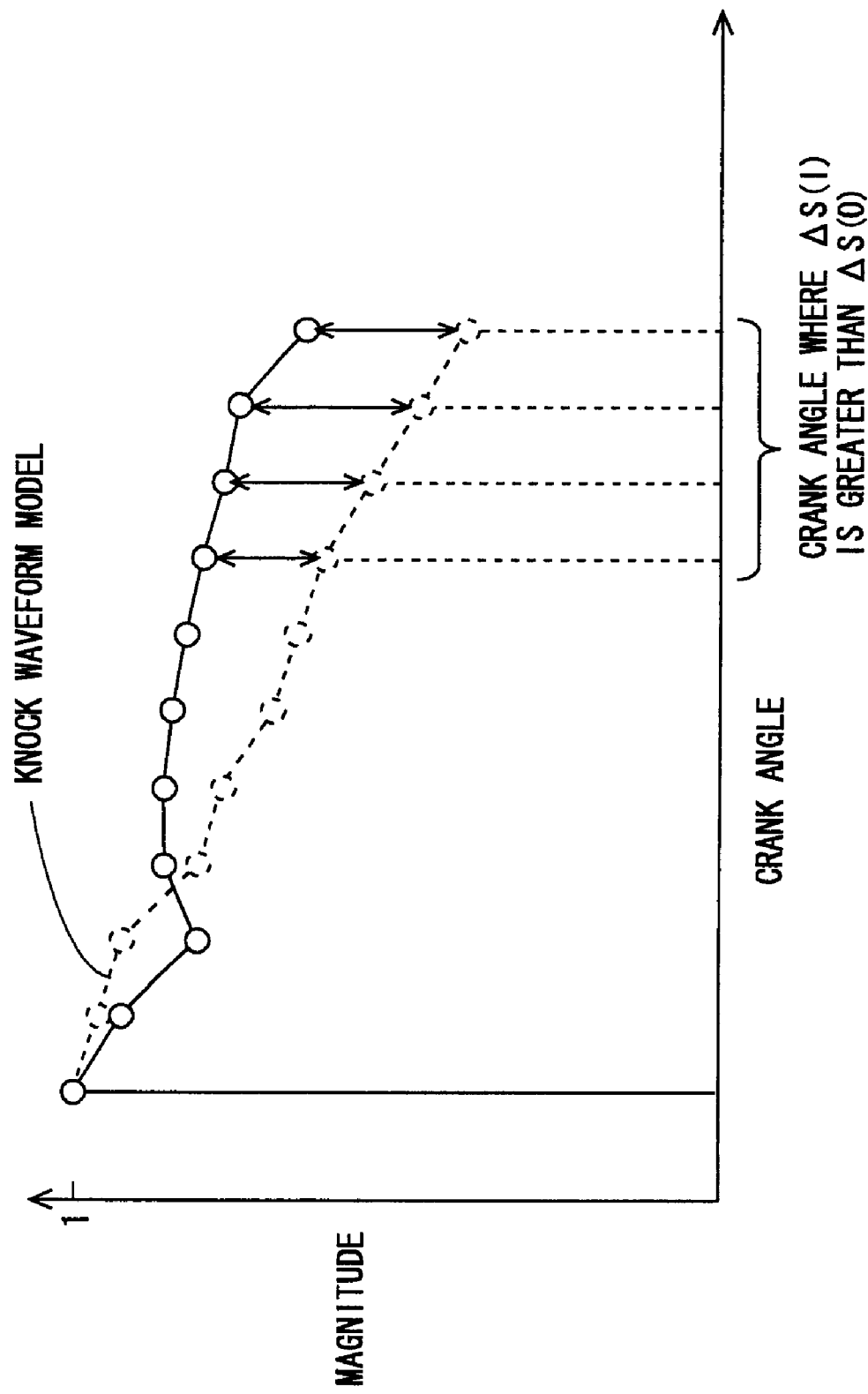
FIG. 24 is a chart (No. 7) for comparing the vibration waveform of fourth frequency band D with the knock waveform model.

As shown in FIG. 24, since a vibration waveform that is greatly different from the knock waveform model is obtained, when there is ΔS(I) greater than threshold value ΔS(0) (YES in S202) and the number is "4" (more than "3") (NO in S300), it is highly possible for the obtained vibration waveform not to include vibration due to noise.

Accordingly, without correcting the vibration waveform, the obtained vibration waveform and the knock waveform model are compared with each other and correlation coefficient K is calculated (S312). As a result, an erroneous determination that knocking has occurred while knocking has not occurred can be suppressed.

Thereafter, when it has not temporarily been determined that knocking had occurred (NO in S400), that is, when it is determined that knocking has not occurred, knock magnitude N is not calculated and the processing ends. That is, the calculated correlation coefficient K is used only for forming the above-described frequency distribution (see FIG. 14). Thus, unnecessary processing is suppressed from being performed.

On the other hand, when it has temporarily been determined that knocking had occurred (YES in S400), knock magnitude N is calculated. In calculating knock magnitude N, the integrated values in the synthesized waveform of first to third frequency bands A to C are used.

Figure 25:
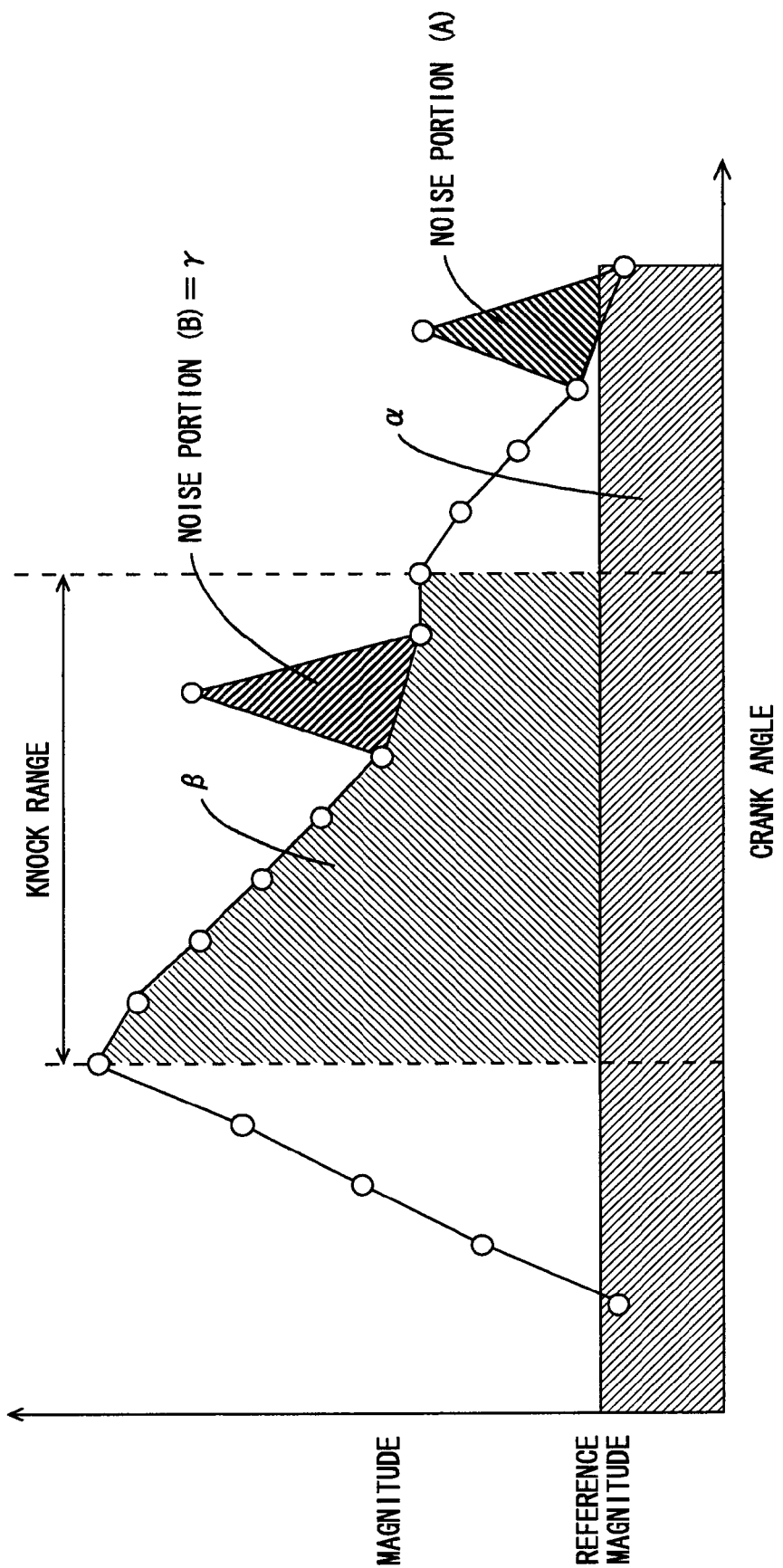
FIG. 25 is a chart (No. 2) showing a synthesized waveform of first to third frequency bands A to C used for calculating a knock magnitude N.

As shown in FIG. 25, a noise portion (A) and a noise portion (B) corresponding to vibration due to noise can be mixed also in the synthesized waveform of first to third frequency bands A to C. In order to remove the noise portions, using α that is a value obtained by summing (integrating) reference magnitudes for crank angles of 90°, β that is a portion where integrated values are greater than the reference magnitude in the knock range, γ that is a correction amount, knock magnitude N is calculated by an equation, $N=(\alpha+(\beta-\gamma)\times K)/\alpha$ (S500).

That is, knock magnitude N is calculated using β, which is a portion where integrated values are greater than the reference magnitude in the knock range where magnitude of vibration due to knocking is great, and without using portions where integrated values are greater than the reference magnitude in ranges other than the knock range (the ranges except for the knock range in the knock detection gate, where magnitude of vibration due to knocking is smaller than in the knock range). Thus, noise portion (A) in FIG. 25, which is outside the knock range, can be removed. Accordingly, in a range where magnitude of vibration due to knocking is small, the integrated value considered to be due to noise since a great integrated value is calculated, can be removed.

Further, knock magnitude N is calculated subtracting correction amount γ from β which is a portion where integrated values are greater than the reference magnitude in the knock range. Thus, noise portion (B) in FIG. 25, which is inside the knock range, can be removed. Accordingly, in a range where magnitude of vibration due to knocking is great, the integrated value considered to be due to noise since a great integrated value is calculated, can be removed.

When thus calculated knock magnitude N is greater than determination value V(KX) (YES in S502), it is determined that knocking has occurred (S504), and ignition timing is retarded (S506). This can suppress occurrence of knocking.

On the other hand, when knock magnitude N is not greater than determination value V(KX) (NO in S502), it is determined that knocking has not occurred (S508), and ignition timing is advanced (S510). Thus, by comparing knock magnitude N and determination value V(KX) with each other, whether or not knocking has occurred is determined for each ignition cycle, and the ignition timing is retarded or advanced.

As above, according to the engine ECU that is the knocking determining device according to the embodiment, whether there is an integrated value greater than a product of the reference magnitude and coefficient Y among the integrated values of vibration in fourth frequency band D that includes first to third frequency bands A to C is determined. When there is an integrated value greater than a product of the reference magnitude and coefficient Y, knock magnitude N is calculated using the integrated values in the synthesized waveform of first to third frequency bands A to C and correlation coefficient K calculated from a vibration waveform of fourth frequency band D. Based on a comparison between knock magnitude N and determination value V(KX), whether or not knocking has occurred is determined for each ignition cycle. On the other hand, if there is no integrated value greater than a product of the reference magnitude and coefficient Y, it is determined that knocking has not occurred. Thus, when it can be regarded that knocking is likely to have occurred, whether or not knocking has occurred can precisely be determined fully considering the characteristics of both knocking and noise. Conversely, when it is less likely that knocking has occurred, it can be determined that knocking has not occurred. This can suppress erroneous determination that knocking has occurred while it has not. As a result, whether knocking is present or absent can precisely be determined.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A device for determining knocking of an internal combustion engine, comprising
   an operation unit, wherein
   said operation unit detects a magnitude of vibration in a first frequency band that includes a frequency of vibration due to knocking, out of vibration occurring in said internal combustion engine,
   said operation unit detects a magnitude of vibration in a second frequency band that includes said first frequency band and that is broader than said first frequency band, out of the vibration occurring in said internal combustion engine,
   said operation unit detects a waveform of the vibration in the second frequency band, based on the magnitude of the vibration in said second frequency band,
   said operation unit determines whether or not a magnitude greater than a predetermined threshold value is detected from the vibration in said second frequency band,
   when it is determined that the magnitude greater than said predetermined threshold value is detected from the vibration in said second frequency band, said operation unit determines whether or not knocking has occurred based on a result of comparison between the waveform detected from the magnitude of the vibration in said second frequency band and a waveform model that is a reference of the vibration occurring in said internal combustion engine and on the magnitude of the vibration in said first frequency band, and when it is determined that the magnitude greater than said predetermined threshold value is not detected from the vibration in said second frequency band, said operation unit determines that knocking has not occurred.

2. The device for determining knocking of the internal combustion engine according to claim 1, wherein said operation unit determines whether or not a magnitude greater than said predetermined threshold value is detected from the vibration in said second frequency band in a first interval of crank angle out of the first interval of crank angle and a second interval of crank angle in which a magnitude of the vibration due to knocking is smaller than in said first interval, when it is determined that the magnitude greater than said predetermined threshold value is detected from the vibration in said second frequency band in said first interval, said operation unit determines whether or not knocking has occurred based on a result of comparison between the waveform detected from the magnitude of the vibration in said second frequency band and said waveform model and on the magnitude of the vibration in the first frequency band, and when it is determined that the magnitude greater than said predetermined threshold value is not detected from the vibration in said second frequency band in said first interval, said operation unit determines that knocking has not occurred.

3. The device for determining knocking of the internal combustion engine according to claim 1, wherein when it is determined that the magnitude greater than said predetermined threshold value is not detected from the vibration in said second frequency band, said operation unit determines that knocking has not occurred, while not determining whether knocking has occurred or not based on a result of comparison between the waveform detected from the magnitude of the vibration in said second frequency band and said waveform model and on the magnitude of the vibration in said first frequency band.

4. The device for determining knocking of the internal combustion engine according to claim 1, wherein said threshold value is a value calculated based on predetermined number of magnitudes selected by placing higher priority on smaller magnitudes out of the detected magnitudes.

5. The device for determining knocking of the internal combustion engine according to claim 4, wherein said threshold value is a value calculated as a product of an average value of predetermined number of magnitudes selected by placing higher priority on smaller magnitudes out of the detected magnitudes and a predetermined coefficient.

6. A device for determining knocking of an internal combustion engine, comprising:

first magnitude detecting means for detecting a magnitude of vibration in a first frequency band that includes a frequency of vibration due to knocking, out of vibration occurring in said internal combustion engine, second magnitude detecting means for detecting a magnitude of vibration in a second frequency band that includes said first frequency band and that is broader than said first frequency band, out of the vibration occurring in said internal combustion engine;

waveform detecting means for detecting a waveform of the vibration in the second frequency band, based on the magnitude of the vibration in said second frequency band;

first determining means for determining whether or not a magnitude greater than a predetermined threshold value is detected by said second magnitude detecting means;

second determining means for determining, when it is determined that the magnitude greater than said predetermined threshold value is detected by said second magnitude detecting means, whether or not knocking has occurred based on a result of comparison between the waveform detected from the magnitude of the vibration in said second frequency band and a waveform model that is a reference of the vibration occurring in said internal combustion engine and on the magnitude detected by said first magnitude detecting means; and third determining means for determining that knocking has not occurred, when it is determined that the magnitude greater than said predetermined threshold value is not detected by said second magnitude detecting means.

7. The device for determining knocking of the internal combustion engine according to claim 6, wherein said first determining means includes means for determining whether or not a magnitude greater than said predetermined threshold value is detected by said second magnitude detecting means in a first interval of crank angle out of the first interval of crank angle and a second interval of crank angle in which a magnitude of the vibration due to knocking is smaller than in said first interval, said second determining means includes means for determining, when it is determined that the magnitude greater than said predetermined threshold value is detected by said second magnitude detecting means in said first interval, whether or not knocking has occurred based on a result of comparison between the waveform detected from the magnitude of the vibration in said second frequency band and said waveform model and on the magnitude detected by said first magnitude detecting means, and said third determining means includes means for determining that knocking has not occurred, when it is determined that the magnitude greater than said predetermined threshold value is not detected by said second magnitude detecting means in said first interval.

8. The device for determining knocking of the internal combustion engine according to claim 6, wherein said third determining means includes means for determining that knocking has not occurred, while not determining whether knocking has occurred or not based on a result of comparison between the waveform detected from the magnitude of the vibration in said second frequency band and said waveform model and on the magnitude detected by said first magnitude detecting means.

9. The device for determining knocking of the internal combustion engine according to claim 6, wherein said threshold value is a value calculated based on predetermined number of magnitudes selected by placing higher priority on smaller magnitudes out of the detected magnitudes.

10. The device for determining knocking of the internal combustion engine according to claim 9, wherein said threshold value is a value calculated as a product of an average value of predetermined number of magnitudes selected by placing higher priority on smaller magnitudes out of the detected magnitudes and a predetermined coefficient.

11. A method of determining knocking of the internal combustion engine, comprising the steps of:
   detecting a magnitude of vibration in a first frequency band that includes a frequency of vibration due to knocking, out of vibration occurring in said internal combustion engine;
   detecting a magnitude of vibration in a second frequency band that includes said first frequency band and that is broader than said first frequency band, out of the vibration occurring in said internal combustion engine;
   detecting a waveform of the vibration in the second frequency band, based on the magnitude of the vibration in said second frequency band;
   determining whether or not a magnitude greater than a predetermined threshold value is detected from the vibration in said second frequency band;
   when it is determined that the magnitude greater than said predetermined threshold value is detected from the vibration in said second frequency band, determining whether or not knocking has occurred based on a result of comparison between the waveform detected from the magnitude of the vibration in said second frequency band and a waveform model that is a reference of the vibration occurring in said internal combustion engine and on the magnitude of the vibration in said first frequency band; and
   when it is determined that the magnitude greater than said predetermined threshold value is not detected from the vibration in said second frequency band, determining that knocking has not occurred.

12. The method of determining knocking of the internal combustion engine according to claim 11 wherein
   said step of determining whether or not the magnitude greater than the predetermined threshold value is detected from the vibration in said second frequency band includes a step of determining whether or not a magnitude greater than said predetermined threshold value is detected from the vibration in said second frequency band in a first interval of crank angle out of the first interval of crank angle and a second interval of crank angle in which a magnitude of the vibration due to knocking is smaller than in said first interval,
   said step of determining whether or not knocking has occurred includes a step of determining, when it is determined that the magnitude greater than said predetermined threshold value is detected from the vibration in said second frequency band in said first interval, whether or not knocking has occurred based on a result of comparison between the waveform detected from the magnitude of the vibration in said second frequency band and said waveform model and on the magnitude of the vibration in the first frequency band, and
   said step of determining that knocking has not occurred includes a step of determining, when it is determined that the magnitude greater than said predetermined threshold value is not detected from the vibration in said second frequency band in said first interval, determining that knocking has not occurred.

13. The method of determining knocking of the internal combustion engine according to claim 11, wherein
   said step of determining that knocking has not occurred includes a step of determining that knocking has not occurred, while not determining whether knocking has occurred or not based on a result of comparison between the waveform detected from the magnitude of the vibration in said second frequency band and said waveform model and on the magnitude of the vibration in said first frequency band.

14. The method of determining knocking of the internal combustion engine according to claim 11 wherein
   said threshold value is a value calculated based on predetermined number of magnitudes selected by placing higher priority on smaller magnitudes out of the detected magnitudes.

15. The method of determining knocking of the internal combustion engine according to claim 14, wherein
   said threshold value is a value calculated as a product of an average value of predetermined number of magnitudes selected by placing higher priority on smaller magnitudes out of the detected magnitudes and a predetermined coefficient.

* * * * *